United States Patent
Matsuo et al.

(10) Patent No.: US 12,117,641 B2
(45) Date of Patent: Oct. 15, 2024

(54) LAMINATED BODY AND MANUFACTURING METHOD THEREOF, LIGHT GUIDE PLATE UNIT, LIGHT SOURCE UNIT, DISPLAY DEVICE, PROJECTION IMAGE DISPLAY MEMBER, PROJECTION IMAGE DISPLAY DEVICE, AND DISPLAY SCREEN FILTER

(71) Applicant: Toray Industries, Inc., Tokyo (JP)

(72) Inventors: Yuji Matsuo, Otsu (JP); Takayuki Uto, Otsu (JP); Miyu Shiraishi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 553 days.

(21) Appl. No.: 17/441,993

(22) PCT Filed: Mar. 17, 2020

(86) PCT No.: PCT/JP2020/011683
§ 371 (c)(1),
(2) Date: Sep. 22, 2021

(87) PCT Pub. No.: WO2020/196090
PCT Pub. Date: Oct. 1, 2020

(65) Prior Publication Data
US 2022/0155514 A1 May 19, 2022

(30) Foreign Application Priority Data

Mar. 26, 2019 (JP) ................................. 2019-058129
Nov. 15, 2019 (JP) ................................. 2019-206891

(51) Int. Cl.
*G02B 5/30* (2006.01)
*F21V 8/00* (2006.01)
*G02F 1/1335* (2006.01)

(52) U.S. Cl.
CPC ........... *G02B 6/0068* (2013.01); *G02B 5/305* (2013.01); *G02B 5/3083* (2013.01); *G02F 1/133528* (2013.01)

(58) Field of Classification Search
CPC .... G02B 6/0068; G02B 5/305; G02B 5/3083; G02B 5/28; G02B 5/281; G02B 5/285; (Continued)

(56) References Cited

U.S. PATENT DOCUMENTS 5,808,798 A * 9/1998 Weber .................. G02B 27/283
359/583
6,960,010 B2 11/2005 Matsumoto et al.
(Continued)

FOREIGN PATENT DOCUMENTS

JP 2002014213 A 1/2002
JP 2002174723 A 6/2002
(Continued)

OTHER PUBLICATIONS

International Search Report and Written Opinion for International Application No. PCT/JP2020/011683, dated Jun. 16, 2020, 8 pages.

*Primary Examiner* — Arnel C Lavarias
(74) *Attorney, Agent, or Firm* — Buchanan Ingersoll & Rooney PC

(57) ABSTRACT

Embodiments disclose an optical material having a visual confirmation effect due to higher directivity of light reflection than a conventional optical material. Embodiments can include a laminate having a multilayer laminated film in which 11 or more layers of different thermoplastic resins are alternately laminated. With respect to light in a wavelength range of 400 to 700 nm and that is perpendicularly incident on an outer surface of the multilayer laminated film, the laminate has an average transmittance in the above wavelength range of 50% or more. When average reflectances in a wavelength range of 400 to 700 nm with respect to S-wave light in the wavelength range, incident at angles of 20° and 70° with respect to the normal line of the outer surface of the film at azimuths ϕn (n: 1 to 5), are given as Rs20(ϕn) and Rs70(ϕn), respectively, the laminate satisfies, at least one azimuth ϕn:Rs70(ϕn)−Rs20(ϕn)≥50(%).

28 Claims, 4 Drawing Sheets

(58) Field of Classification Search
CPC .......... G02B 5/286; G02B 5/287; G02B 5/30;
G02B 5/3025; G02B 5/3033; G02B
5/3041; G02B 5/3066; G02F 1/133528;
G02F 1/133536
USPC ............ 359/485.03, 483.01, 485.01, 485.02,
359/489.01, 489.07, 489.15, 489.19, 577,
359/580, 584, 586, 588, 589, 590
See application file for complete search history.

(56) References Cited

U.S. PATENT DOCUMENTS

| | | | |
|---|---|---|---|
| 7,038,852 B2 | 5/2006 | Takahara et al. | |
| 7,141,297 B2 | 11/2006 | Condo et al. | |
| 7,744,987 B2 | 6/2010 | Hebrink et al. | |
| 7,851,054 B2 | 12/2010 | Weber et al. | |
| 9,063,293 B2 | 6/2015 | Weber et al. | |
| 9,158,155 B2 | 10/2015 | Weber | |
| 10,324,302 B2 | 6/2019 | Yano | |
| 2014/0192418 A1 | 7/2014 | Suzuki | |

FOREIGN PATENT DOCUMENTS

| | | | |
|---|---|---|---|
| JP | 2003295183 A | 10/2003 | |
| JP | 2006512619 A | 4/2006 | |
| JP | 2007307893 A | 11/2007 | |
| JP | 2011085959 A | 4/2011 | |
| JP | 4691910 B2 | 6/2011 | |
| JP | 4816419 B2 | 11/2011 | |
| JP | 2012212148 A | 11/2012 | |
| JP | 2013508777 A | 3/2013 | |
| JP | 2013061480 A | 4/2013 | |
| JP | 2014224891 A | 12/2014 | |
| JP | 2016040605 A | 3/2016 | |

\* cited by examiner

LAMINATED BODY AND MANUFACTURING METHOD THEREOF, LIGHT GUIDE PLATE UNIT, LIGHT SOURCE UNIT, DISPLAY DEVICE, PROJECTION IMAGE DISPLAY MEMBER, PROJECTION IMAGE DISPLAY DEVICE, AND DISPLAY SCREEN FILTER

CROSS REFERENCE TO RELATED APPLICATIONS

This is the U.S. National Phase application of PCT/JP2020/011683, filed Mar. 17, 2020 which claims priority to Japanese Patent Application No. 2019-058129, filed Mar. 26, 2019 and Japanese Patent Application No. 2019-206891, filed Nov. 15, 2019, the disclosures of each of these applications being incorporated herein by reference in their entireties for all purposes.

FIELD OF THE INVENTION

The present invention relates to a laminate and a method for manufacturing the laminate, a light guide plate unit, a light source unit, a display device, a projected image display element, a projected image display device, and a display screen filter.

BACKGROUND OF THE INVENTION

A multilayer laminated film, obtained by alternately laminating a plurality of different thermoplastic resins, is allowed to have various performances, and has various configurations having layers varying from two to several thousands in number, and having the layer thickness varying from several tens nanometers to several tens micrometers. Among them, a multilayer laminated film (Patent Documents 1, 2, etc.) is disclosed in which a plurality of thermoplastic resins having different refractive indices are alternately laminated, so as to cause interference reflection to occur with respect to light at any incident angle in both a front direction and an oblique direction.

On the other hand, in recent years, for example, in a head-mounted display (HMD) or a head-up display (HUD) in augmented reality or mixed reality applications, a material capable of superimposing and displaying video information of a virtual world and character information on video information of the real world is required. The material is, for example, a material having a visual confirmation effect due to high directivity of light reflection, such as a material that allows video information of the real world to be viewed from the front, and allows video information of the virtual world and character information to be projected obliquely to be displayed. As a multilayer laminated film that does not substantially cause interference reflection with respect to incident light in a front direction and causes interference reflection with respect to incident light in an oblique direction, an optical film that appears colored at an inclination angle is disclosed in Patent Document 3.

PATENT DOCUMENTS

Patent Document 1: Japanese Patent Laid-open Publication No. 2011-85959
Patent Document 2: Japanese Patent Laid-open Publication No. 2012-212148
Patent Document 3: Japanese Unexamined Patent Application Publication (Translation of PCT Application) No. 2006-512619

SUMMARY OF THE INVENTION

However, the multilayer laminated film disclosed in Patent Document 3 does not have high directivity of light reflection as required for those applied for augmented reality and mixed reality, and only the utility as a color shift film is consistently mentioned in Patent Document 3. If an antireflection function such as anti-reflection (AR) or anti-glare (AG) is imparted to the surface of the multilayer laminated film disclosed in Patent Document 3, or clear materials are laminated on both sides of the film, in order to enhance the transmittance in the front direction of the multilayer laminated film, the reflectance of light in the oblique direction is also further lowered.

An object of the present invention is to provide an optical material having a visual confirmation effect due to higher directivity of light reflection than a conventional optical material.

In light of the above-described object and background art, the inventors of the present invention have dared to consider S-wave light (s-polarized light), which has been determined not to contribute to light reflection in Patent Document 3. The inventors thus have arrived at the present invention.

That is, the present invention according to exemplary embodiments provides a laminate having a multilayer laminated film in which 11 or more layers of a plurality of different thermoplastic resins are alternately laminated, wherein, with respect to light in a wavelength range of 400 to 700 nm and that is perpendicularly incident on an outer surface of the multilayer laminated film, the laminate has an average transmittance in the wavelength range of 50% or more, and when average reflectances in a wavelength range of 400 to 700 nm with respect to S-wave light in the wavelength range that is incident at angles of 20° and 70° with respect to a normal line of the outer surface of the multilayer laminated film at azimuths $\phi_n$ (n: 1 to 5), are given as $Rs20(\phi_n)$ and $Rs70(\phi_n)$, respectively, the laminate satisfies, at least one azimuth $\phi_n$:

$$Rs70(\phi_n)-Rs20(\phi_n) \geq 50(\%).$$

The present invention according to exemplary embodiments also provides a method for manufacturing the laminate according to an embodiment of the present invention having a layer having birefringence, the method including:
providing a layer having birefringence on a base material; laminating a multilayer laminated film on a side, of the layer having birefringence, on which the base material is not disposed; peeling off the base material; and laminating another multilayer laminated film on a side, of the layer having birefringence, from which the base material is peeled off.

The present invention according to exemplary embodiments also provides a method for manufacturing the laminate according to an embodiment of the present invention having a layer having birefringence, the method including the step of laminating a multilayer laminated film on one side or both sides of the layer having birefringence and then stretching the film in at least one direction.

The present invention according to exemplary embodiments also provides a method for manufacturing the laminate according to an embodiment of the present invention having a layer having birefringence, the method including the step of applying a coating liquid containing a component constituting a layer having birefringence onto a multilayer laminated film.

The present invention according to exemplary embodiments also provides a method for manufacturing the laminate of the present invention having a depolarizing layer, the method including: providing a depolarizing layer on a base material; laminating a multilayer laminated film on a side, of the depolarizing layer, on which the base material is not disposed; peeling off the base material; and laminating another multilayer laminated film on a side, of the depolarizing layer, from which the base material is peeled off.

The present invention according to exemplary embodiments also provides a method for manufacturing the laminate of the present invention having a depolarizing layer, the method including the step of laminating a multilayer laminated film on one side or both sides of the depolarizing layer, and then stretching the film in at least one direction.

The present invention according to exemplary embodiments also provides a method for manufacturing the laminate of the present invention having a depolarizing layer, the method including the step of applying a coating liquid containing a component constituting the depolarizing layer onto a multilayer laminated film.

The present invention according to exemplary embodiments also provides a light guide plate unit including the laminate of the present invention arranged on an emitting surface side of a light guide plate.

The present invention according to exemplary embodiments also provides a light source unit including the light guide plate unit of the present invention and a light source.

Further, the present invention according to exemplary embodiments provides a light source unit including the laminate of the present invention arranged on an emitting surface side of a substrate on which a plurality of light sources are provided.

The present invention according to exemplary embodiments also provides a display device including the light source unit of the present invention.

The present invention according to exemplary embodiments also provides a projected image display element including the laminate of the present invention.

The present invention according to exemplary embodiments also provides a projected image display device including: the projected image display element of the present invention; and a light source from which light is incident at an angle of 20° or more with respect to a normal line of a display surface of the projected image display element.

The present invention according to exemplary embodiments also provides a display screen filter including the laminate of the present invention.

The present invention according to exemplary embodiments also provides a display device including the laminate of the present invention in an image display area.

With the present invention, it is possible to obtain a laminate that does not cause interference reflection substantially to occur with respect to light that is incident from the front direction, and has a high transmittance, and causes interference reflection to occur with respect to both P and S waves incident in an oblique direction, thereby having very high reflection performance with respect to light in the oblique direction as compared with conventional configurations, as well as to obtain a method for manufacturing the laminate.

DETAILED DESCRIPTION OF EMBODIMENTS OF THE INVENTION

The present inventors have found that a laminate described blow substantially does not cause interference reflection to occur in the front direction, has a high transmittance, and causes interference reflection to occur in both the P wave and the S wave incident in the oblique direction. The laminate includes a multilayer laminated film in which 11 or more layers of a plurality of different thermoplastic resins are alternately laminated, wherein, with respect to light in a wavelength range of 400 to 700 nm and that is perpendicularly incident on an outer surface of the multilayer laminated film, the laminate has an average transmittance in the wavelength range of 50% or more, and when average reflectances in a wavelength range of 400 to 700 nm with respect to S-wave light in the wavelength range that is incident at angles of 20° and 70° with respect to a normal line of the outer surface of the multilayer laminated film at azimuths $\phi_n$ (n: 1 to 5) are given as $Rs20(\phi_n)$ and $Rs70(\phi_n)$, respectively, the laminate satisfies, at at least one azimuth $\phi_n$:

$$Rs70(\phi_n) - Rs20(\phi_n) \geq 50(\%).$$

This will be described in detail below.

Figure 1:
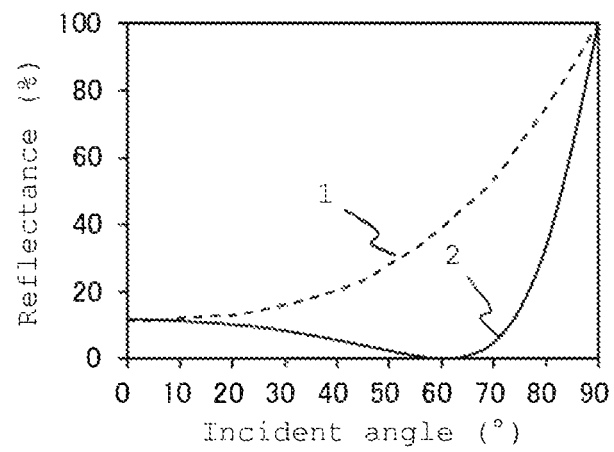
FIG. 1 is a graph showing incident angle dependence of reflectance of a conventional clear film with respect to P- and S-wave incident light having a wavelength of 550 nm.
Figure 2:
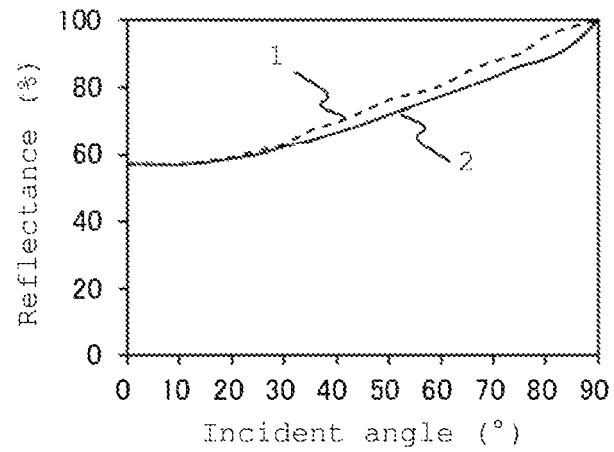
FIG. 2 is a graph showing incident angle dependence of reflectance of a conventional reflective film with respect to P- and S-wave incident light having a wavelength of 550 nm.
Figure 3:
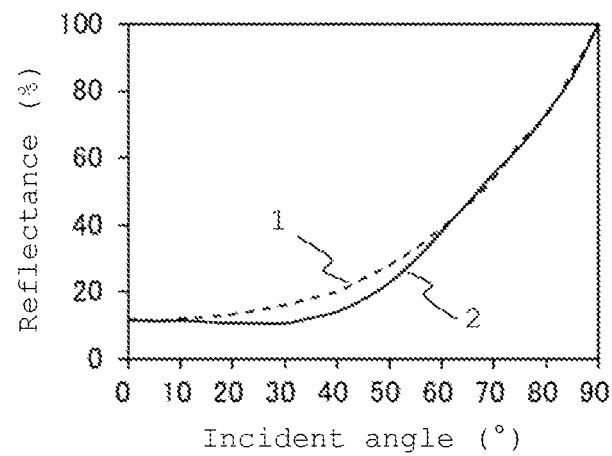
FIG. 3 is a graph showing incident angle dependence of reflectance of a multilayer laminated film included in the laminate according to an embodiment of the present invention with respect to P- and S-wave incident light having a wavelength of 550 nm.

Among the electromagnetic waves (light) incident on the outer surface of an object from an oblique direction, the P wave is an electromagnetic wave in which an electric field component is parallel to the incident surface (linearly polarized light vibrating in parallel to the incident surface), and the S wave is an electromagnetic wave in which an electric field component is perpendicular to the incident surface (linearly polarized light vibrating perpendicular to the incident surface). The reflection characteristics of these P and S waves will be described. FIG. 1 shows the angle dependence of the reflectance of a conventional clear film when P- and S-wave light having a wavelength of 550 nm is incident on the film from the air, FIG. 2 shows that of a conventional reflective film, and FIG. 3 shows that of a multilayer laminated film included in the laminate according to an embodiment of the present invention. Here, exemplary cases with a wavelength of 550 nm are illustrated, but each film has substantially the same relationship as that illustrated in FIGS. 1 to 5 in other cases with wavelengths of visible light as well.

As shown in FIG. 1, in the conventional clear film, the reflectance with respect to the P wave decreases as the incident angle increases, and after the reflectance becomes 0%, the reflectance tends to increase, according to the Fresnel equation. The reflectance with respect to the S wave increases as the incident angle increases.

As illustrated in FIGS. 2 and 3, the difference in reflectance due to the incident angle, observed between the conventional reflective film and the multilayer laminated film included in the laminate according to an embodiment of the present invention, is due to different designs of an interlayer difference in refractive index in the in-plane direction (hereinafter, it is also referred to as an "in-plane refractive index difference") of layers each of which is obtained by alternately laminating a plurality of different thermoplastic resins, and an interlayer difference in refractive index in the thickness direction (hereinafter, the refractive index difference is also referred to as a "perpendicular refractive index difference") of the layers.

That is, the conventional reflective film is designed to increase the in-plane refractive index difference between adjacent layers and thereby increasing the perpendicular refractive index difference as a result, to cause interference reflection in both the front direction and the oblique direction. As illustrated in FIG. 2, characteristics thereof are as follows: the conventional reflective film constantly has a high reflectance even when the incident angle is 0 degrees; and both of the reflectances with respect to the P wave and the S wave increase as the incident angle increases.

On the other hand, the multilayer laminated film included in the laminate according to an embodiment of the present invention is designed so that an in-plane refractive index difference between adjacent layers in the multilayer laminated film is decreased to cause the interference reflection in the front direction substantially not to occur, and the perpendicular refractive index difference is increased to cause interference reflection to occur with respect to the P wave of the light incident in an oblique direction. That is, the multilayer laminated film is characterized in that: at an incident angle of 0 degrees, the multilayer laminated film has a low reflectance (that is, a high transmittance) because the in-plane refractive index difference between adjacent layers in the multilayer laminated film is small; and, as the incident angle increases, the reflectance of the S wave increases according to Fresnel equation based on the difference between the refractive index of air and the in-plane refractive index of the surface of the multilayer laminated film, and the P wave has a large perpendicular refractive index difference between adjacent layers in the multilayer laminated film, interference reflection occurs and reflectance increases. Here, the reflection of the surface of the multilayer laminated film contributes to the reflectance with respect to the S wave. Regarding the angle dependence of the reflectance shown in FIG. 3, when the reflectance in the oblique direction is to be further increased, the increase of reflectance with respect to the P wave can be achieved by further increasing the perpendicular refractive index difference between adjacent layers in the multilayer laminated film or by increasing the number of layers of the multilayer laminated film, but to increase the reflectance with respect to the S wave is not easy. This is because reflection with respect to the S wave is caused by reflection on the surface of the multilayer laminated film. In order to increase the reflectance with respect to the S wave, it is therefore necessary to further increase the difference between the refractive index of air and the in-plane refractive index of the surface of the multilayer laminated film. However, when the refractive index difference between air and the surface of the multilayer laminated film is further increased, the reflectance in the front direction also increases, and the transmittance in the front direction decreases.

Figure 4:
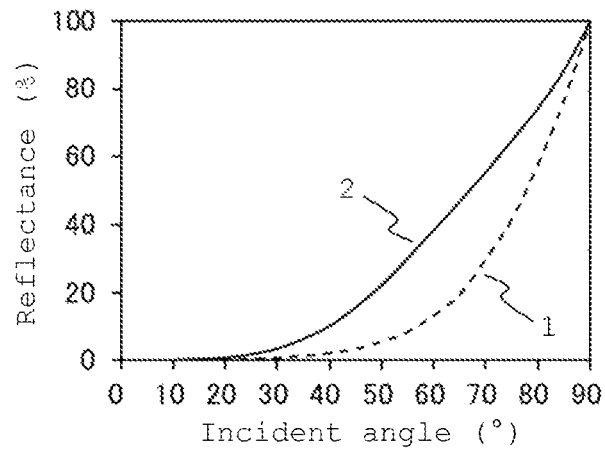
FIG. 4 is a graph showing the incident angle dependence of reflectance of a multilayer laminated film, included in the laminate according to an embodiment of the present invention, coated with an anti-reflection (AR) coating with respect to P- and S-wave incident light having a wavelength of 550 nm.

In addition, when a reflection preventing function such as anti-reflection (AR) or anti-glare (AG) is imparted to the surface of the multilayer laminated film in order to increase the transmittance in the front direction, or when clear materials are laminated on both sides of the multilayer laminated film by processing, reflection by the surface of the multilayer laminated film is almost lost. FIG. 4 shows exemplary reflection characteristics when AR coating is applied to the surface of the multilayer laminated film included in the laminate according to an embodiment of the present invention shown in FIG. 3. As for the reflectance in the front direction, the reflectance is lowered (that is, the transmittance is improved) by the AR coating, and as for the reflectance in the oblique direction, the interference reflection with respect to the P wave is not affected by the AR coating, so that the reflectance with respect to the P wave is hardly changed as compared with that shown in FIG. 3. On the other hand, regarding the S wave, since the surface reflection is affected by the AR coating, the reflectance of the S wave significantly decreases as compared with FIG. 3.

Figure 5:
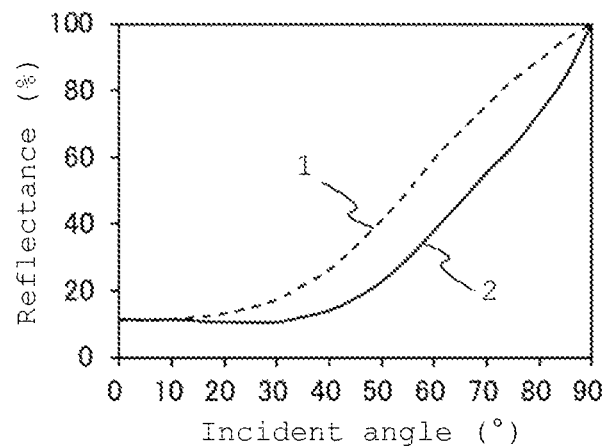
FIG. 5 is a graph showing incident angle dependence of reflectance of the laminate according to an embodiment of the present invention with respect to P- and S-wave incident light having a wavelength of 550 nm.

FIG. 5 shows the angular dependence of the reflectance of the laminate according to an embodiment of the present invention when P- and S-wave light having a wavelength of 550 nm is incident from the air. The laminate according to an embodiment of the present invention is characterized in that interference reflection in an oblique direction occurs not only with respect to the P wave but also with respect to the S wave, and the reflectance with respect to the S wave in the oblique direction is higher than those of the films as shown in FIGS. 1 and 3.

The laminate according to an embodiment of the present invention is required to have an average transmittance of 50% or more in the wavelength range of 400 to 700 nm, with respect to light in the above wavelength range and that is perpendicularly incident on the outer surface of the multilayer laminated film. The average transmittance is preferably 70% or more, more preferably 80% or more, still more preferably 85% or more, and still more preferably 88% or more from the viewpoint of improving the transparency in the front direction. The higher the average transmittance is, the more the visibility in the front direction is improved, which is preferable, and therefore the average transmittance is most preferably 100%.

In addition, from the viewpoint of improving the transparency in the front direction and suppressing a decrease in visibility due to reflection of external light, the average reflectance in a wavelength range of 400 nm to 700 nm with respect to light in the above wavelength range and perpendicularly incident on the outer surface of the multilayer laminated film is preferably 30% or less, more preferably 20% or less, and still more preferably 15% or less. The lower the average reflectance is, the more the transparency in the front direction can be improved, and a decrease in visibility due to reflection of external light can be suppressed. Therefore, the average reflectance is most preferably 0%.

Figure 6:
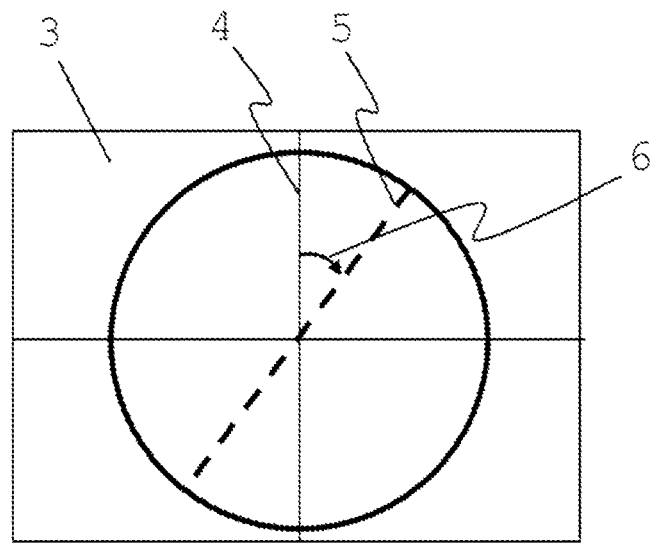
FIG. 6 is a diagram for explaining an azimuth.

The azimuth will be described with reference to the drawings. FIG. 6 is a top view of the laminate or the film according to embodiments of the present invention. Here, "4" in the figure indicates a direction at an azimuth of 0° arbitrarily selected in the film plane, "5" in the figure indicates an azimuth $\phi$ direction as a result of rightward rotation (clockwise rotation) with respect to the direction at the azimuth of 0°, and "6" in the figure indicates the azimuth $\phi$.

The azimuths $\phi_n$ (n: 1 to 5) in the present invention are measurement points set from the azimuth $\phi$, and are five points at 0°, 22.5°, 45°, 67.5°, and 90° set at every 22.5° in rightward rotation (clockwise rotation) with respect to the direction at the azimuth of 0° in the plane of the film or the laminate.

In the laminate according to an embodiment of the present invention, when average reflectances in a wavelength range of 400 to 700 nm with respect to S-wave light in the above wavelength range that is incident at angles of 20° and 70° with respect to the normal line of an outer surface of the multilayer laminated film at azimuths $\phi_n$ (n: 1 to 5) are given as $Rs20(\phi_n)$ and $Rs70(\phi_n)$, respectively, it is necessary that, at at least one azimuth $\phi_n$, the following is satisfied:

$$Rs70(\phi_n)-Rs20(\phi_n) \geq 50(\%) \quad (A).$$

The value of $Rs70(\phi_n)-Rs20(\phi_n)$ is preferably as high as 60% or more, 70% or more, 80% or more, or 90% or more for the purpose of improving light condensability in display applications, improving image displayability in head-up display and head mounted display applications, improving viewing angle controllability in anti-peeping applications, and improving the magnitude of change in hue and glossiness in an oblique direction in decorative film applications. Satisfying the above relational expression (A) means that interference reflection occurs with respect to the incident S wave, and means that reflection performance with respect to light in an oblique direction is higher than that of a conventional product in which interference reflection occurs only with respect to the P wave. In addition, it is preferable that two or more azimuths $\phi_n$ among the five azimuths $\phi_n$ satisfy the above relational expression (A), and for the purpose described above, it is preferable that three or more azimuths $\phi_n$, four or more azimuths $\phi_n$, or five azimuths $\phi_n$ satisfy the above relational expression (A). The larger the number of the azimuths $\phi_n$ satisfying the above relational expression (A), the wider the azimuth range in which interference reflection with respect to the S wave occurs, which means that the laminate has a multi-angle property with smaller azimuth dependency.

Next, average reflectances (%) in a wavelength range of 400 to 700 nm at the azimuths $\phi_n$ (n: 1 to 5) when P-wave light in the wavelength range is incident at angles of 20°, 40°, and 70° with respect to the normal line of the outer surface of the multilayer laminated film are defined as Rp20, Rp40, and Rp70, respectively. That is, the average reflectances in the wavelength range of 400 nm to 700 nm at certain azimuths $\phi_n$ are further averaged at five azimuths $\phi_n$ (n: 1 to 5), whereby Rp20, Rp40, and Rp70 are obtained. The laminate of the present invention preferably satisfies:

$$Rp20 \leq Rp40 < Rp70 \quad (B)$$

from the viewpoint of enhancing the front transmissivity and improving the oblique reflectivity. Rp70 is preferably 30% or more, more preferably 40% or more, and still more preferably 50% or more from the viewpoint of improving the oblique reflectivity. For the purposes of improving light condensability in display applications, improving image display performance in head-up display and head mounted display applications, improving viewing angle controllability in anti-peeping applications, and improving the magnitude of change in hue and glossiness in an oblique direction in decorative film applications, Rp is preferably as high as possible, for example, 60% or more, 70% or more, and 80% or more.

In addition, in a case where it is desired to give the laminate a colorless and glossy appearance like a mirror when the laminate is viewed from an oblique direction, the hue C value calculated from the reflectance of the P wave in a wavelength range of 400 nm to 700 nm when the P wave is incident at an angle of 70° with respect to the normal line of the film surface is preferably 20 or less, more preferably 15 or less, still more preferably 10 or less, and still more preferably 5 or less.

In the laminate according to an embodiment of the present invention, when S-wave light in a wavelength range of 240 nm to 2600 nm is incident at an angle of 70° with respect to the normal line of an outer surface of the multilayer laminated film at an azimuth $\phi_n$, the maximum value of the reflectance in the wavelength range is given as $Rs70(\phi_n)$MAX, and the minimum value of the reflectance in the wavelength range is given as $Rs70(\phi_n)$MIN, it is preferable that, at least one azimuth $\phi_n$, the following is satisfied:

$$Rs70(\phi_n)\text{MAX}-Rs70(\phi_n)\text{MIN} \geq 20(\%) \quad (C).$$

The value of $Rs70(\phi_n)$MAX-$Rs70(\phi_n)$MIN is more preferably 30% or more, still more preferably 40% or more, and particularly preferably 50% or more. For the purposes of improving light condensability in display applications, improving image display performance in head-up display and head mounted display applications, improving viewing angle controllability in anti-peeping applications, and improving the magnitude of change in hue and glossiness in an oblique direction in decorative film applications, Rp is preferably as high as possible, for example, 60% or more, 70% or more, 80% or more, and 90% or more. Satisfying the above relational expression (C) means that interference reflection occurs with respect to the incident S wave, and means that reflection performance with respect to light in an oblique direction is higher than that of a conventional product in which interference reflection occurs only with respect to the P wave. In addition, it is preferable that two or more azimuths $\phi_n$ among the five azimuths $\phi_n$ satisfy the above relational expression (C), and for the purpose described above, it is preferable that three or more azimuths $\phi_n$, four or more azimuths $\phi_n$, or five azimuths $\phi_n$ satisfy the above relational expression (C). The larger the number of the azimuths $\phi_n$ satisfying the above relational expression (C), the wider the azimuth range in which interference reflection with respect to the S wave occurs, which means that the laminate has a multi-angle property with smaller azimuth dependency.

Hereinafter, an example of the multilayer laminated film included in the laminate of the present invention will be described, but the multilayer laminated film included in the laminate of the present invention is not to be construed as being limited to such an example.

The multilayer laminated film included in the laminate according to embodiments of the present invention is a multilayer laminated film in which 11 or more layers of different thermoplastic resins are alternately laminated. As for the lamination configuration, the following are preferable: a multilayer laminated film of 11 or more layers (A/B/A/B . . . ) obtained by alternately laminating a layer (layer A) formed of a thermoplastic resin A and a layer (layer B) formed of a thermoplastic resin B different from the thermoplastic resin A; and a multilayer laminated film of 11 or more layers obtained by alternately laminating the layer A, the layer B, and a layer (layer C) made of a thermoplastic resin C different from the thermoplastic resin A and the thermoplastic resin B, for example, a multilayer laminated film in which units A/B/C are alternately laminated as in A/B/C/A/B/C . . . or units A/C and units B/C are alternately laminated as in A/C/B/C/A/C/B/C . . . .

The description that the thermoplastic resins A, B, and C are "different" as used herein means that the thermoplastic resins A, B, and C are different from one another in any of crystalline/amorphous properties, optical properties, and thermal properties. The difference in optical properties means a difference in refractive index of 0.01 or more, and the difference in thermal properties means a difference in melting point or glass transition temperature of 1° C. or more. In addition, a case where one resin has a melting point and the other resin does not have a melting point, or a case where one resin has a crystallization temperature and the other resin does not have a crystallization temperature also means that these resins have different thermal properties. By laminating thermoplastic resins having different properties, a function that cannot be achieved by a film of a single layer of each thermoplastic resin can be imparted to the film.

Examples of the thermoplastic resin to be used in the multilayer laminated film included in the laminate according to an embodiment of the present invention include: polyolefins such as polyethylene, polypropylene, and poly(4-methylpentene-1); cycloolefins including alicyclic polyolefins which are obtained by ring-opened metathesis polymerization of norbornenes, addition polymerization, and addition copolymers with other olefins; biodegradable polymers such as polylactic acid and polybutyl succinate; polyamides such as nylon 6, nylon 11, nylon 12, and nylon 66; polyesters such as aramid, polymethyl methacrylate, polyvinyl chloride, polyvinylidene chloride, polyvinyl alcohol, polyvinyl butyral, ethylene vinyl acetate copolymer, polyacetal, polyglucholic acid, polystyrene, styrene copolymerized polymethyl methacrylate, polycarbonate, polypropylene terephthalate, polyethylene terephthalate, polybutylene terephthalate, and polyethylene-2,6-naphthalate; polyether sulfone, polyether ether ketone, denaturated-polyphenylene ether, polyphenylene sulfide, polyetherimide, polyimide, polyarylate, tetrafluoroethylene resin, trifluoroethylene resin, trifluoroethylene chloride resin, tetrafluoroethylene-hexafluoropropylene copolymer, and polyvinylidene fluoride. Among them, from the viewpoint of strength, heat resistance, and transparency, it is particularly preferable to use a polyester, and as the polyester, a polyester obtained by polymerization of a monomer mainly composed of an aromatic dicarboxylic acid or an aliphatic dicarboxylic acid and a diol is preferable.

Here, examples of the aromatic dicarboxylic acid include terephthalic acid, isophthalic acid, phthalic acid, 1,4-naphthalene dicarboxylic acid, 1,5-naphthalene dicarboxylic acid, 2,6-naphthalene dicarboxylic acid, 4,4'-diphenyl dicarboxylic acid, 4,4'-diphenyl ether dicarboxylic acid, and 4,4'-diphenyl sulfone dicarboxylic acid. Examples of the aliphatic dicarboxylic acid include adipic acid, suberic acid, sebacic acid, dimer acid, dodecanedioic acid, cyclohexanedicarboxylic acid, and ester derivatives thereof. Among them, terephthalic acid and 2,6-naphthalenedicarboxylic acid are preferable. These acid components may be used alone or in combination of two or more, and may be partially copolymerized with an oxyacid such as hydroxybenzoic acid.

Examples of the diol component include ethylene glycol, 1,2-propanediol, 1,3-propanediol, neopentyl glycol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, diethylene glycol, triethylene glycol, polyalkylene glycol, 2,2-bis(4-hydroxyethoxyphenyl)propane, isosorbate, and spiroglycol. Among them, ethylene glycol is preferably used. These diol components may be used alone or in combination of two or more.

Among the polyesters, it is preferable to use a polyester selected from polyethylene terephthalate and a copolymer thereof, polyethylene naphthalate and a copolymer thereof, polybutylene terephthalate and a copolymer thereof, polybutylene naphthalate and a copolymer thereof, polyhexamethylene terephthalate and a copolymer thereof, and polyhexamethylene naphthalate and a copolymer thereof.

When the multilayer laminated film included in the laminate of the present invention has the multilayer laminated film configuration described above, regarding a preferable combination of the thermoplastic resins having different properties to be used, the absolute value of the difference between the glass transition temperatures of the respective thermoplastic resins is preferably 20° C. or less. By setting the absolute value of the difference in glass transition temperature to 20° C. or less, poor stretching in manufacturing a multilayer laminated film can be suppressed.

When the multilayer laminated film included in the laminate of the present invention has the multilayer laminated film configuration described above, regarding a preferable combination of the thermoplastic resins having different properties to be used, the absolute value of the difference between the SP values (also referred to as solubility parameters) of the respective thermoplastic resins is preferably 1.0 or less. When the absolute value of the difference between the SP values is 1.0 or less, delamination hardly occurs.

The combination of polymers having different properties is preferably a combination of those having the same basic skeleton. The basic skeleton referred to herein is a repeating unit constituting the resin, and for example, when polyethylene terephthalate is used as one thermoplastic resin, ethylene terephthalate, which has the same basic skeleton as polyethylene terephthalate, is preferably contained as the other thermoplastic resin, from the viewpoint of easily realizing a highly accurate laminated structure. As the polyester resins having different optical properties, resins having the same basic skeleton are used, whereby the lamination accuracy can be increased, and delamination at the lamination interface can be further suppressed.

In order to have the same basic skeleton and different properties, a copolymer is desirably used. That is, for example, when one resin is polyethylene terephthalate, the other resin is a resin composed of an ethylene terephthalate unit and a repeating unit having another ester bond. The proportion (sometimes referred to as copolymerization amount) of other repeating units to be added is preferably 5% or more, and more preferably 10% or more, from the viewpoint of the necessity of acquiring different properties. On the other hand, the proportion is preferably 90% or less, and more preferably 80% or less, in order to maintain the accuracy of the thickness and the uniformity of the thickness of each layer because the difference in adhesion between layers and thermal fluid properties is small.

It is also desirable that a blend or an alloy of a plurality of kinds of thermoplastic resins is used for forming each of the layer A and the layer B. By blending or alloying a plurality of types of thermoplastic resins, it is possible to obtain performance that cannot be obtained with one type of thermoplastic resin.

When the multilayer laminated film included in the laminate of the present invention has the multilayer laminated film configuration described above, it is preferable that the thermoplastic resin A and/or the thermoplastic resin B is a polyester. It is also preferable that the thermoplastic resin A contains polyethylene terephthalate as a main component, the thermoplastic-based resin B contains terephthalic acid as a dicarboxylic acid component and ethylene glycol as a diol component, and further contains a polyester containing at least one copolymerization component of naphthalenedicarboxylic acid or cyclohexanedicarboxylic acid as a dicarboxylic acid component as well as cyclohexanedimethanol, spiroglycol or isosorbide as a diol component. In the present invention, the "main component" refers to a component that accounts for more than 50% by mass of the entire resin.

In the multilayer laminated film included in the laminate of the present invention, it is preferable that an in-plane refractive index difference between adjacent layers is small and a difference in a perpendicular refractive index is large. Here, the in-plane refractive index difference is preferably 0.03 or less, more preferably 0.02 or less, and still more preferably 0.01 or less. The perpendicular refractive index difference is preferably greater than 0.03, more preferably 0.06 or more, still more preferably 0.09 or more, and particularly preferably 0.12 or more. When the adjacent layers have such an in-plane refractive index difference and a perpendicular refractive index difference, it is possible to enhance the characteristics of not reflecting but transmitting light in the front direction and reflecting P-wave light in the oblique direction. The layers of the multilayer laminated film can take different in-plane refractive indexes depending on the film in-plane direction. When the thermoplastic resin constituting the layer is an amorphous resin, or when a heat treatment at a temperature higher by 10° C. or more than the melting point is performed even if it is a crystalline resin, the refractive index of the layer can be regarded as isotropy in which the refractive index is a constant refractive index regardless of the in-plane measurement direction, or regardless of whether it is an in-plane refractive index or a perpendicular refractive index. However, when the resin is a crystalline resin and a heat treatment is performed at a temperature equal to or lower than the melting point, the layer can take an in-plane refractive index different depending on the measurement direction. The unevenness in the measurement direction of the in-plane refractive index is preferably 0.03 or less, more preferably 0.02 or less, and still more preferably 0.01 or less. In order to reduce the unevenness in the measurement direction of the in-plane refractive index, the following configuration can be adopted: in biaxial stretching in which the multilayer laminated film is stretched in the longitudinal direction and the width direction, the orientation of the thermoplastic resin in the longitudinal direction and the width direction by stretching is balanced. When the unevenness in the measurement direction of the in-plane refractive index is reduced, the unevenness in the reflectance at each azimuth of the laminate according to embodiments of the present invention is reduced.

Adjusting the reflectance in a desired wavelength range can be achieved by adjusting a perpendicular refractive index difference between adjacent layers; adjusting the number of laminated layers in the multilayer laminated film; adjusting a layer thickness distribution of each layer; and adjusting film formation conditions (for example, the stretching ratio, the stretching speed, the stretching temperature, the heat treatment temperature, and the heat treatment time).

A preferred configuration of the two-type alternate lamination of the layer A and the layer B is, for example, a combination of the following layers A and B: the layer A made of a crystalline thermoplastic resin; and the layer B containing a resin mainly composed of an amorphous thermoplastic resin or a resin mainly composed of a crystalline thermoplastic resin having a melting point lower by 15° C. or more than the melting point of the thermoplastic resin of the layer A. Since the reflectance is increased and the number of laminated layers is reduced, it is preferable that the difference in the perpendicular refractive index difference between the layer A and the layer B is high, and the number of laminated layers is preferably 101 or more, more preferably 401 or more, and still more preferably 601 or more. From the viewpoint of an increase in the size of the lamination device, the upper limit of the number of layers is about 5000. Regarding the layer thickness distribution, it is preferable that the optical thicknesses of the adjacent layers A and B satisfy the following formula (1).

[Mathematical formula 1]

$$\lambda = 2(n_A d_A + n_B d_B) \quad (1)$$

Here, λ represents a reflection wavelength, $n_A$ represents a perpendicular refractive index of the layer A, $d_A$ represents a thickness of the layer A, $n_B$ represents a perpendicular refractive index of the layer B, and $d_B$ represents a thickness of the layer B.

The preferable layer thickness distribution is, for example, a constant layer thickness distribution from the film surface on one side toward the film surface on the opposite side, a layer thickness distribution such that the layer thickness increases or decreases from the film surface on one side toward the film surface on the opposite side, a layer thickness distribution such that the layer thickness increases from the film surface on one side toward the film center and then decreases, a layer thickness distribution such that the layer thickness decreases from the film surface on one side toward the film center and then increases, and the like. As a design of the layer thickness distribution, the following configurations are preferred: continuously changing ones such as linear distribution, equal ratio distribution, and a gradient sequence; and configurations in which about 10 to 50 layers having substantially the same layer thickness are provided and the layer thickness changes stepwise.

On each of the surface layer portions of the multilayer laminated film, a layer having a layer thickness of 3 μm or more is preferably provided as a protective layer. The thickness of the protective layer is preferably 5 μm or more, more preferably 10 μm or more. By increasing the thickness of the protective layer in this manner, effects as follows can be achieved: suppression of so-called flow marks, which are molding defects during film formation; suppression of deformation of the thin film layers in the multilayer laminated film in a lamination step with another film or a molded body and after the lamination step; and improvement in pressing resistance.

The thickness of the multilayer laminated film used in the present invention is not particularly limited, but is preferably, for example, 20 μm to 300 μm. When the thickness is 20 μm or more, the film can be stiffened and handleability can be improved. When the thickness is 300 μm or less, it is possible to suppress deterioration of moldability due to excessive stiffness of the film.

Figure 7:
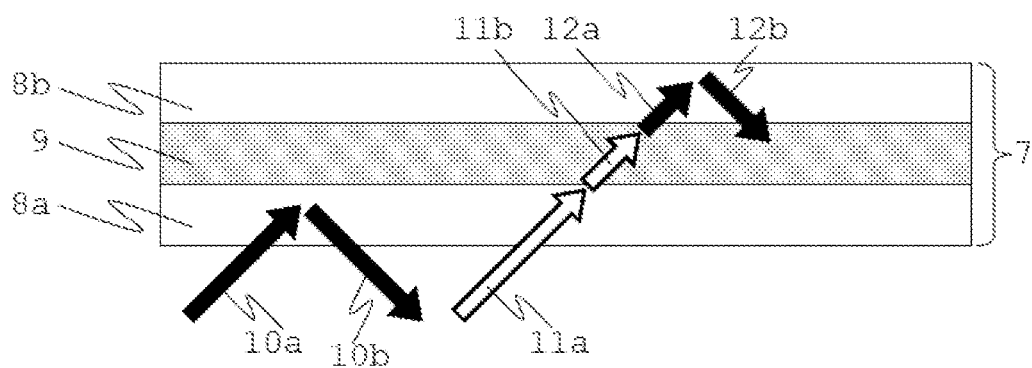
FIG. 7 is a schematic diagram for explaining interference reflection with respect to S-wave incident light in the laminate according to an embodiment of the present invention.
Figure 9:
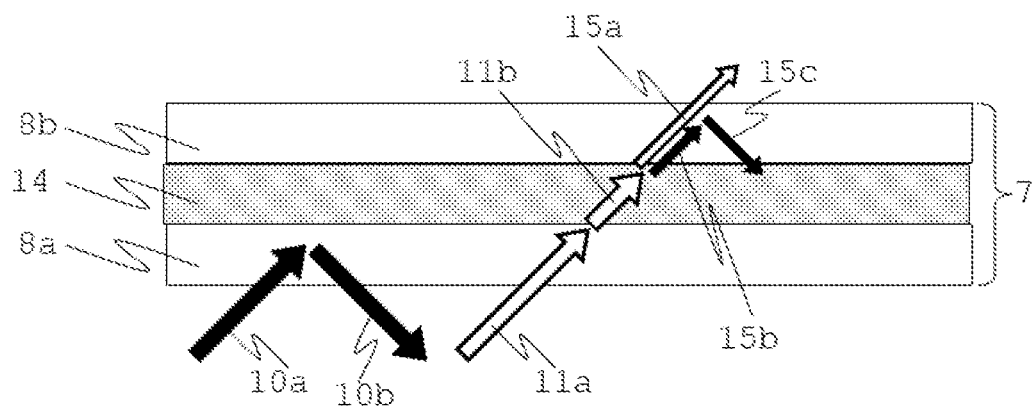
FIG. 9 is a schematic diagram illustrating interference reflection with respect to S-wave incident light in the laminate according to an embodiment of the present invention.

Next, the principle that the laminate according to embodiments of the present invention causes interference reflection even with respect to the S wave will be described with reference to the aspects shown in FIGS. 7 and 9 as one aspect of the laminate of the present invention. FIGS. 7 and 9, which are cross-sectional views of the laminate 7, explain interference reflection of the S wave by the laminate according to embodiments of the present invention. The reference numeral "10a" denotes the P wave incident on the laminate of the present invention, and the reference numeral "11a" denotes the S wave incident on the laminate of the present invention. Note that the components that are not subjected to interference reflection or are subjected to surface reflection by the laminate of the present invention are not illustrated in FIGS. 7 and 9. The P wave 10a incident on the laminate according to embodiments of the present invention are subjected to interference reflection by the multilayer laminated film 8a. Note that, although not illustrated, in a case where the reflectance with respect to the P wave is not 100%, a part of the incident P wave is transmitted. Although not illustrated, reflection of the P wave (surface reflection) on the surface of the multilayer laminated film also occurs. On the other hand, the S wave 11a is transmitted through the multilayer laminated film 8a without being subjected to interference reflection. Although not illustrated, a part of the incident S wave is reflected (surface reflection) by the surface of the multilayer laminated film.

In FIG. 7, the S wave 11b transmitted through the multilayer laminated film 8a is converted into the P wave 12a by passing through a layer (hereinafter, may also be referred to as a "birefringence layer") 9 having birefringence. The multilayer laminated film 8b on the back side as viewed from the incident direction of the birefringence layer 9 is caused to interfere and reflect the P wave 12a resulting from this conversion, whereby interference reflection occurs not only with respect to P waves but also for S waves incident on the laminate of the present invention. That is, in the aspect shown in FIG. 7, the multilayer laminated film actually performs interference reflection with respect to the P wave, but substantially both the P wave and the S wave incident on the laminate are involved in the interference reflection.

In FIG. 9, the S wave 11b passes through a depolarizing layer 14 to be converted into a P wave 15a and an S wave 15b. The multilayer laminated film 8b on the back side as viewed from the incident direction of the depolarizing layer 14 is caused to interfere and reflect the P wave 15b resulting from this conversion, whereby interference reflection occurs not only with respect to P waves but also for S waves incident on the laminate of the present invention. That is, in the aspect shown in FIG. 9, the multilayer laminated film actually performs interference reflection with respect to the P wave, but substantially both of a part of the P wave and a part of the S wave incident on the laminate contribute to the interference reflection.

Figure 8:
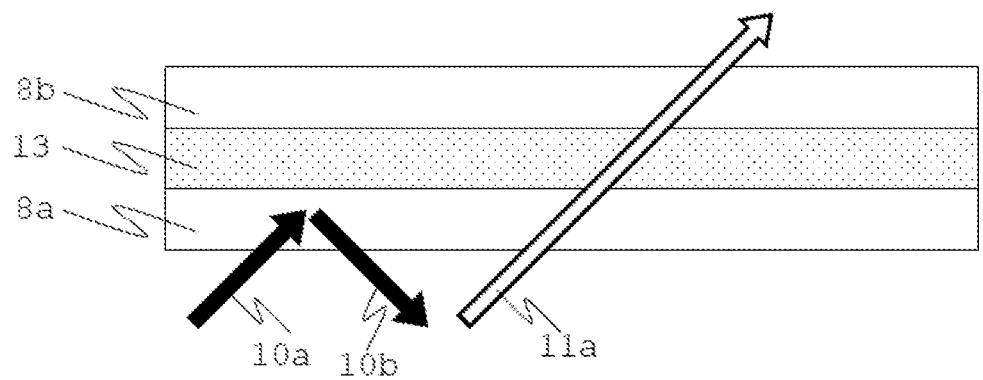
FIG. 8 is a schematic diagram illustrating interference reflection with respect to S- and P-wave incident light in a conventional technique.

On the other hand, FIG. 8 is a cross-sectional view of a laminate in which multilayer laminated films 8a and 8b are laminated with a clear adhesive 13 as an example in the case of using the conventional technique. When the clear adhesive 13 having no function of controlling polarized light is used, interference reflection derived from the S wave incident on the laminate does not occur even if any number of multilayer laminated films are laminated.

The laminate of the present invention is preferably a laminate including the multilayer laminated films and the birefringence layer described above, and is preferably configured to include the multilayer laminated films on both sides of the layer having birefringence, or configured to include the multilayer laminated films on both sides of the layer having birefringence with adhesive layers interposed therebetween. An example of a preferable aspect of the laminate including the multilayer laminated films and the birefringence layer is the laminate of FIG. 7.

The birefringence layer has a characteristic of changing a polarization state of light passing therethrough. When the azimuth of the main orientation axis of the birefringence layer in the in-plane direction is 0°, and the polarized light passes through the birefringence layer with the azimuth $\phi$ of the vibration direction of the polarized light with respect to the azimuth of the main orientation axis of 0° being in a range of 0°<$\phi$<90°, the polarization characteristic of the polarized light changes. That is, when the S wave passes through the birefringence layer with the azimuth $\phi_s$ of the vibration being in a range of 0°<$\phi_s$<90°, a part or all components of the S wave are converted into the P wave.

The conversion from the S wave to the P wave upon passing thereof through the birefringence layer is determined by a phase difference (Re) of the birefringence layer and an azimuth ($\phi_s$) formed by the direction of the main orientation axis in an in-plane direction of the birefringence layer and a direction of vibration of the incident S wave.

Regarding the phase difference of the birefringence layer, the phase difference (Re (590)) at a wavelength of 590 nm is preferably in a range of 100 nm to 500 nm. As to a $\lambda$/4 plate having the effect of converting an S wave having a wavelength of ¼ of the phase difference into a P wave and an S wave, Re (590) is more preferably in a range of 100 nm to 200 nm, and still more preferably in a range of 100 nm to 180 nm (140±40 nm). As to a $\lambda$/2 plate having the effect of converting an S wave having a wavelength of ½ of the phase difference into a P wave, Re (590) is more preferably in a range of 200 nm to 400 nm, still more preferably in a range of 200 nm to 360 nm, and still more preferably in a range of 240 nm to 320 nm (280±40 nm).

The phase difference is calculated by birefringence× thickness. The birefringence of the birefringence layer in the in-plane direction is preferably $0.5 \times 10^{-3}$ or more, more preferably $1.0 \times 10^{-3}$ or more, and still more preferably $3.0 \times 10^{-3}$ or more.

Next, an example of the phase difference and the polarization conversion of the S wave is described below. When an S wave passes through a birefringence layer having Re (590) of 280 nm with the orientation of vibration of the S wave being an azimuth $\phi_s$=45° with respect to the orientation of the main orientation axis of the birefringence layer, the direction of vibration of the S wave is converted by 90°, whereby the S wave becomes the P wave. In addition, when an S wave passes through a birefringence layer having Re (590) of 140 nm with the direction of vibration of the S wave being an azimuth $\phi_s$=45° with respect to the direction of the main orientation axis of the birefringence layer, ½ of the S wave is converted into the P wave. Since this conversion efficiency is maximized at the azimuth $\phi_s$=45° and becomes less effective as the angle diverges from 45°, the angle $\phi_s$ formed by the direction of the vibration direction of the S wave and the direction of the orientation axis of the birefringence layer is preferably in ranges of 0°<$\phi_s$<90° and 90°<$\phi_s$<180°, more preferably in ranges of 15°<$\phi_s$<75° and 105°<$\phi_s$<165°, and still more preferably in ranges of 30°<$\phi_s$<60° and 120°<$\phi_s$<150°.

The birefringence layer included in the laminate of the present invention preferably contains a thermoplastic resin or a liquid crystal as a main component. The thermoplastic resin preferably contains any one of polyvinyl alcohol, polycarbonate, cycloolefin, and polymethyl methacrylate as a main component. With these components, a phase difference of 100 nm to 500 nm can be relatively easily obtained. Polyvinyl alcohol, polycarbonate, cycloolefin, and polymethyl methacrylate are preferably stretched in the form of a film or a sheet in at least one direction to have birefringence. As for the liquid crystal, the liquid crystal preferably includes ethylenically unsaturated groups such as an acryloyl group, a methacryloyl group, and a styryl group, cationic polymerizable groups such as an epoxy group and an oxetane group, and the like. Examples of the shape of the liquid crystal molecule include a rod shape and a disk shape. After the liquid crystal is dispersed in the matrix, the liquid crystal is preferably coated over a base material or a multilayer laminated film and is aligned in one direction. Examples of the orientation method include a rubbing method of pressing a roller and then rotating the roller, and a photo-orientation method of projecting light such as ultraviolet rays or visible rays in a linearly polarized light state.

The birefringence layer included in the laminate of the present invention is preferably uniaxially oriented. When the birefringence layer is uniaxially oriented, the amount of change in the phase difference with respect to the incident angle and the azimuth is reduced, so that dependency of polarization conversion of the S wave with respect to the incident angle and the azimuth is reduced, which is preferable.

The thickness of the birefringence layer of the laminate of the present invention is not particularly limited, but is preferably, for example, 1 μm to 200 μm. When the birefringence layer contains a thermoplastic resin as a main component, the thickness is more preferably 5 μm to 100 μm, and when the birefringence layer contains a liquid crystal as a main component, the thickness is more preferably 1 μm to 20 μm.

The laminate according to embodiments of the present invention is a laminate including multilayer laminated films and a layer having a depolarizing effect (hereinafter, may also be referred to as a "depolarizing layer") containing liquid crystal and/or particles having an aspect ratio of 1.5 or more, and the laminate also preferably has a configuration in which multilayer laminated films are provided on both sides of the depolarizing layer, or a configuration in which multilayer laminated films are provided on both sides of the depolarizing layer with adhesive layers being interposed therebetween. Since the depolarizing layer has an effect of converting linearly polarized light passing therethrough into elliptically or circularly polarized light, the S wave, when passing through the depolarizing layer, are converted into elliptically or circularly polarized light including the S wave and the P wave. FIG. 9 shows an example of a preferred aspect of a laminate including a multilayer laminated film and a depolarizing layer.

In addition, examples of the depolarizing layer include a configuration in which a liquid crystal and particles (hereinafter, may also be referred to as a "depolarizing material") having an aspect ratio of 1.5 or more are dispersed in a matrix. The depolarizing material preferably has a birefringence Δn of 0.001 or more. In addition, the dispersion state of the depolarizing material in the matrix is preferably such that a direction of refraction with a high refractive index and a direction of refraction with a low refractive index of the depolarizing material are randomly dispersed (not aligned) in the matrix. As a result of the random dispersion state, various phase differences are generated with respect to the polarized light passing through the depolarizing layer, so that the polarized light is depolarized.

From the viewpoint of reducing the haze, the difference between the refractive index of the matrix and the average refractive index of the depolarizing material is preferably 0.1 or less. The content of the depolarizing material in the matrix is not particularly limited, but for example, is preferably 10 to 90% by mass, more preferably 10 to 60% by mass, and still more preferably 10 to 40% by mass with respect to the total mass of the matrix. One depolarizing material may be used, or two or more depolarizing materials may be used.

The liquid crystal used for the depolarizing layer is preferably a random liquid crystal having a random orientation, and the particles having an aspect ratio of 1.5 or more are preferably inorganic particles.

As the liquid crystal used for the depolarizing layer, the liquid crystal preferably includes ethylenically unsaturated groups such as an acryloyl group, a methacryloyl group, and a styryl group, cationic polymerizable groups such as an epoxy group and an oxetane group, and the like. Examples of the shape of the liquid crystal molecule include a rod shape and a disk shape. It is also preferable to add a chiral agent. The content of the chiral agent is not particularly limited, but is, for example, 0.1 to 10% by mass with respect to the total mass of the matrix.

Examples of the particles having an aspect ratio of 1.5 or more include cellulose, polystyrene, acryl, silica, strontium, magnesium, calcium, carbonates thereof, and oxides thereof, as well as titanium, zirconium, germanium, tin, and oxides thereof. Examples of the shape include a needle shape, a rod shape, a polygonal column shape, and a spindle shape. The size of the particles is such that the length in the minor axis direction is 1 nm or more, usually 100 μm or less, and preferably 1000 nm or less, the aspect ratio is 2.0 or more, more preferably 5.0 or more, and still more preferably 10 or more, and although there is no particular upper limit, it is about 1000 from the manufacturing limit or the like.

The matrix is formed with, for example, a resin such as a thermosetting resin or a thermoplastic resin. Examples of the thermosetting resin include epoxy, thermosetting polyimide, phenol, melamine, diallyl phthalate, silicone, and urethane. Examples of the thermoplastic resin include olefin, acryl, styrene, polyester, polyacrylonitrile, maleimide, polyvinyl acetate, ethylene-vinyl acetate copolymer, polyamide, polyvinyl chloride, polyacetal, polyphenylene oxide, polyphenylene sulfide, polysulfone, polyether sulfone, polyether ether ketone, polyallyl sulfone, polyether imide, polymethylpentene, fluorine, and cellulose. Examples of the material other than the resin include glass.

As a method for manufacturing the depolarizing layer, it is preferable to add a depolarizing material to a matrix and manufacture the depolarizing material into a film or sheet shape, or to disperse the depolarizing material in a matrix and then coat a base material or a multilayer laminated film with the same.

The laminate of the present invention preferably has the above-described multilayer laminated film on at least one surface layer.

The laminate of the present invention and/or the multilayer laminated film included in the laminate may further include a primer layer, a hard coat layer, and an antireflection layer (AR, AG) on the surface thereof in order to increase the transmittance in the front direction. By providing a layer having a refractive index lower than that of the surface, the transmittance of light perpendicularly incident on the film surface can be increased.

laminate of the present invention and/or the multilayer laminated film included in the laminate may further include functional layers on the surface in addition, examples of which include an abrasion resistance layer, a scratch prevention layer, a color correction layer, an ultraviolet ray absorption layer, a light stabilization layer (HALS), a heat ray absorption layer, a printing layer, a gas barrier layer, and an adhesive layer. These layers may be a single layer or a multilayer, and one layer may have a plurality of functions. The multilayer laminated film may contain additives such as an ultraviolet absorber, a light stabilizer (HALS), a heat ray absorber, a crystal nucleating agent, and a plasticizer.

Examples of specific aspects for manufacturing the multilayer laminated film included in the present invention will be described below, but the multilayer laminated film included in the present invention is not to be construed as being limited by such examples.

When the multilayer laminated film included in embodiments of the present invention has a lamination configuration of a multilayer laminated film of 11 or more layers (A/B/A/B . . . ) obtained by alternately laminating a layer (layer A) formed of a thermoplastic resin A and a layer (layer B) formed of a thermoplastic resin B different from the thermoplastic resin A, the thermoplastic resins are supplied from two extruders, an extruder A corresponding to the layer A and an extruder B corresponding to the layer B, and the polymers from the respective flow paths are laminated.

In addition, when the multilayer laminated film included in embodiments of the present invention has a laminated configuration a multilayer laminated film of 11 or more layers obtained by alternately laminating the layer A, the layer B, and a layer (layer C) made of a thermoplastic resin C different from the thermoplastic resin A and the thermoplastic resin B (for example, a multilayer laminated film in which units A/B/C are alternately laminated as in A/B/C/A/B/C . . . or units A/C and units B/C are alternately laminated as in A/C/B/C/A/C/B/C . . . ), the thermoplastic resins are supplied from three extruders, an extruder A corresponding to the layer A, an extruder B corresponding to the layer B, and an extruder C corresponding to the layer C, and the polymers from the respective flow paths are laminated.

If necessary, it is also preferable to dry each thermoplastic resin before charging it into the extruder.

The lamination can be performed by a method using a multi-manifold type feed block and a square mixer which are known lamination devices, or by a method using only a comb type feed block. Then, the melt is melt-extruded into a sheet form using a T-shaped mouthpiece or the like, and then cooled and solidified on a casting drum to obtain an unstretched multilayer laminated film. As a method for enhancing the lamination accuracy, methods described in Japanese Patent Laid-Open Publication No. 2007-307893, Japanese Patent No. 4691910, and Japanese Patent No. 4816419 are preferable.

Subsequently, the unstretched multilayer laminated film is stretched and heat-treated. As a stretching method, it is preferable to employ biaxial stretching by a known sequential biaxial stretching method or a simultaneous biaxial stretching method. The stretching temperature is preferably in a range of the glass transition temperature or higher of the unstretched multilayer laminated film and the glass transition temperature+80° C. or lower. The stretching ratio is preferably in a range of 2 to 8 in each of the longitudinal direction and the width direction, and more preferably in a range of 3 to 6. It is preferable to reduce the difference between the stretching ratio in the longitudinal direction and the stretching ratio in the width direction. The stretching in the longitudinal direction is preferably performed using a speed change between longitudinal stretching machine rolls. The stretching in the width direction is performed using a known tenter method. That is, the film is conveyed while both ends of the film are held by clips, and the film is stretched in the width direction by widening the clip interval between both ends of the film.

In the stretching using a tenter, simultaneous biaxial stretching is also preferably performed. A case where simultaneous biaxial stretching is performed is described below. The unstretched film cast on the cooling roll is guided to a simultaneous biaxial tenter, conveyed while both ends of the film are held with clips, and stretched simultaneously and/or stepwise in the longitudinal direction and the width direction. The stretching in the longitudinal direction can be achieved by increasing the distance between the clips of the tenter, and the stretching the width direction can be achieved by increasing the distance between the rails on which the clips run. The tenter clips for performing the stretching and the heat treatment in the present invention are preferably driven by a linear motor system. In addition, there are a pantograph method, a screw method, and the like, and among them, the linear motor method is excellent in that the stretching ratio can be freely changed because the degree of freedom of each clip is high.

It is also preferable to perform heat treatment after stretching. The heat treatment temperature is preferably performed at a temperature in a range of the stretching temperature or higher and the melting point of the thermoplastic resin of the layer A–10° C. or lower, and it is also preferable to perform the cooling step at a temperature in a range of the heat treatment temperature–30° C. or lower after the heat treatment. In addition, it is also preferable to reduce the dimension of the film (relax the film) in the width direction and/or the longitudinal direction during the heat treatment step or the cooling step in order to reduce the thermal shrinkage of the film. The relaxation ratio is preferably in a range of 1% to 10%, and more preferably in a range of 1 to 5%.

Finally, the film is wound with a winding machine to manufacture a multilayer laminated film included in the laminate according to embodiments of the present invention.

There will be described below examples of specific aspects of the method for manufacturing, a laminate according to embodiments of the present invention, a configuration in which multilayer laminated films are provided on both sides of a layer having birefringence, or a configuration in which multilayer laminated films are provided on both sides of a layer having birefringence with adhesive layers being interposed therebetween. However, the method for manufacturing a laminate included in the present invention is not to be construed as being limited by such examples.

(1-1) A manufacturing method in which multilayer laminated films and a birefringence layer are laminated directly or with adhesive layers interposed therebetween can be preferably employed.

In this case, the birefringence layer is preferably in the form of a film or a sheet. In order to improve the adhesion between the multilayer laminated films and the birefringence layer, primer layers are preferably provided on the adhesion surface side of either or both the multilayer laminated films and the birefringence layer. The lamination method is preferably roll lamination, and it is also preferable to apply heat and/or ultraviolet rays at the time of lamination and/or after lamination.

(1-2) A manufacturing method can also be preferably employed that includes: providing a birefringence layer on a base material; laminating a multilayer laminated film on a side, of the birefringence layer, on which the base material is not disposed; peeling off the base material; and laminating another multilayer laminated film on a side, of the birefringence layer, from which the base material is peeled off.

Examples of the base material include a polymer film and glass, and a polyolefin film and a polyester film are preferable. It is also preferable to provide a release layer between the base material and the birefringence layer so that the base material and the birefringence layer are easily peeled off. In order to improve the adhesion between the multilayer laminated film and the birefringence layer, it is also preferable to provide a primer layer on the adhesion surface side of the multilayer laminated film with the birefringence layer. In particular, it is preferable to design the release layer or the primer layer so that the adhesion between the base material and the birefringence layer is smaller than the adhesion between the multilayer laminated film and the birefringence layer. In addition, it is also preferable to use an adhesive layer between the multilayer laminated film and the birefringence layer when they are laminated. The lamination method is preferably roll lamination, and it is also preferable to apply heat and/or ultraviolet rays at the time of lamination and/or after lamination.

(1-3) A manufacturing method including a step of laminating a multilayer laminated film on one side or both sides of a birefringence layer and then stretching the film in at least one direction can also be preferably employed.

In order to improve the adhesion between the multilayer laminated films and the birefringence layer, primer layers are preferably provided on the adhesion surface side of either or both the multilayer laminated films and the birefringence layer. In addition, it is also preferable to use an adhesive layer between the multilayer laminated film and the birefringence layer when they are laminated. The lamination method is preferably roll lamination, and it is also preferable to apply heat and/or ultraviolet rays at the time of lamination and/or after lamination. As the stretching method, it is preferable to perform stretching using a speed change between rolls, or to use a tenter, and the stretching direction is preferably stretching in the longitudinal direction or the width direction, stretching in the oblique direction, or the like. The stretching temperature is preferably in a range of the glass transition temperature or higher of the multilayer laminated film and/or the layer having birefringence and the glass transition temperature+80° C. or lower, and the stretching ratio is preferably more than 1 and 8 or less.

(1-4) A manufacturing method including a step of applying a coating liquid containing a component constituting the birefringence layer onto the multilayer laminated film can also be preferably employed.

In order to improve the adhesion between the multilayer laminated film and the birefringence layer, it is also preferable to provide a primer layer on the adhesion surface side of the multilayer laminated film with the birefringence layer. Examples of the coating method include bar coating, gravure coating, and die coating. It is also preferred to apply heat and/or ultraviolet radiation, immediately after a coating liquid containing a component constituting the birefringence layer is applied onto the multilayer laminated film, or after the coating liquid is applied onto the multilayer laminated film, and then another multilayer laminated film is laminated on the side, of the birefringence layer, on which the multilayer laminated film is not laminated.

Next, there will be described below examples of specific aspects of the method for manufacturing, as a laminate according to embodiments of the present invention, a configuration in which multilayer laminated films are provided on both sides of a depolarizing layer, or a configuration in which multilayer laminated films are provided on both sides of a depolarizing layer with adhesive layers being interposed therebetween. However, the method for manufacturing a laminate included in the present invention is not to be construed as being limited by such examples.

(2-1) A manufacturing method in which multilayer laminated films and a depolarizing layer are laminated directly or with adhesive layers interposed therebetween can be preferably employed.

In this case, the depolarizing layer is preferably in the form of a film or a sheet.

In order to improve the adhesion between the multilayer laminated films and the depolarizing layer, primer layers are preferably provided on the adhesion surface side of either or both the multilayer laminated films and the depolarizing layer. The lamination method is preferably roll lamination, and it is also preferable to apply heat and/or ultraviolet rays at the time of lamination and/or after lamination.

(2-2) A manufacturing method can also be preferably employed that includes: providing a depolarizing layer on a base material; laminating a multilayer laminated film on a side, of the depolarizing layer, on which the base material is not disposed; peeling off the base material; and laminating another multilayer laminated film on a side, of the depolarizing layer, from which the base material is peeled off.

Examples of the base material include a polymer film and glass, and a polyolefin film and a polyester film are preferable. It is also preferable to provide a release layer between the base material and the birefringence layer so that the base material and the depolarizing layer are easily peeled off. In addition, in order to improve the adhesion between the multilayer laminated film and the depolarizing layer, it is also preferable to provide a primer layer on the adhesion surface side of the multilayer laminated film with the depolarizing layer. In particular, it is preferable to design the release layer or the primer layer so that the adhesion between the base material and the depolarizing layer is smaller than the adhesion between the multilayer laminated film and the depolarizing layer. In addition, it is also preferable to use an adhesive layer between the multilayer laminated film and the depolarizing layer when they are laminated. The lamination method is preferably roll lamination, and it is also preferable to apply heat and/or ultraviolet rays at the time of lamination and/or after lamination.

(2-3) A manufacturing method including a step of laminating a multilayer laminated film on one side or both sides of a layer having birefringence and then stretching the film in at least one direction can also be preferably employed.

In order to improve the adhesion between the multilayer laminated films and the depolarizing layer, primer layers are preferably provided on the adhesion surface side of either or both the multilayer laminated films and the depolarizing layer. In addition, it is also preferable to use an adhesive layer between the multilayer laminated film and the depolarizing layer when they are laminated. The lamination method is preferably roll lamination, and it is also preferable to apply heat and/or ultraviolet rays at the time of lamination and/or after lamination. As the stretching method, it is preferable to perform stretching using a speed change between rolls, or to use a tenter, and the stretching direction is preferably stretching in the longitudinal direction or the width direction, stretching in the oblique direction, or the like. The stretching temperature is preferably in a range of the glass transition temperature or higher of the multilayer laminated film and/or the layer having birefringence and the glass transition temperature+80° C. or lower, and the stretching ratio is preferably more than 1 and 8 or less. However, from the viewpoint that a direction of refraction with a high refractive index and a direction of refraction with a low refractive index of the depolarizing material are randomly dispersed (not aligned) in the matrix, it is preferable that the stretching conditions suppress the orientation of the depolarizing material.

(2-4) A manufacturing method including a step of applying a coating liquid containing a component constituting the depolarizing layer onto the multilayer laminated film can also be preferably employed.

In order to improve the adhesion between the multilayer laminated film and the depolarizing layer, it is also preferable to provide a primer layer on the adhesion surface side of the multilayer laminated film with the depolarizing layer. Examples of the coating method include bar coating, gravure coating, and die coating. It is also preferred to apply heat and/or ultraviolet radiation, immediately after a coating liquid containing a component constituting the depolarizing layer is applied onto the multilayer laminated film, or after the coating liquid is applied onto the multilayer laminated film, and then another multilayer laminated film is laminated on the side, of the depolarizing layer, on which the multilayer laminated film is not disposed.

Since the laminate according to embodiments of the present invention has a characteristic of transmitting light in the front direction and not transmitting light in the oblique direction, it can be suitably used particularly for various applications related to displays.

The light guide plate unit according to embodiments of the present invention includes the laminate of the present invention arranged on the emitting surface side of the light guide plate, thereby being capable of exhibiting excellent front light condensing properties. Regarding the positional relationship of the laminate of the present invention in the light guide plate unit, it is preferable that the laminate of the present invention is disposed on the emitting surface side with respect to the light guide plate, and it is preferable that the laminate is used on the exit side of the emitted light. For example, the positional relationship is as follows: reflective film/light guide plate/laminate of the present invention/ diffusion sheet/prism sheet; reflective film/light guide plate/ diffusion sheet/laminate of the present invention/prism sheet; or reflective film/light guide plate/diffusion sheet/ prism sheet/laminate of the present invention.

The light source unit according to embodiments of the present invention uses the laminate of the present invention or the light guide plate unit of the present invention, thereby being also excellent in front light condensing properties. The light source unit is preferably an edge-type light source unit (edge-type backlight) including the light guide plate unit of the present invention and a light source, and a downlight-type light source unit (downlight backlight) in which the laminate of the present invention is disposed on an emitting surface side of a substrate on which a plurality of light sources are installed. Regarding the positional relationship of the laminate of the present invention when the light source unit is of the downlight type, it is preferable to dispose the laminate of the present invention on the emitting surface side with respect to the diffusion plate, which is as follows: reflective film/diffusion plate/laminate of the present invention/prism sheet; or reflective film/diffusion plate/ prism sheet/laminate of the present invention. Further, the installation is preferably not only in a state where there is an air gap, but also in a state where the laminate is bonded with another element using a pressure-sensitive adhesive, an adhesive, or the like.

A prism sheet can be omitted since the emitted light can be condensed by the laminate of the present invention. This is common to the light guide plate unit of the present invention and the downlight-type light source unit of the present invention. Examples of the reflective film include a film that performs diffuse reflection or specular reflection, and in particular, a film having high diffuse reflectivity is preferable, and a white reflective film is preferable. The diffusion film or the prism sheet does not have to be one in number, and two or more diffusion films or prism sheets may be used.

Examples of the light source include a white light source, a red, blue, or green monochromatic light source, and a combination of two of these monochromatic light sources. The emission band thereof preferably has a range of 450 nm to 650 nm. Considering the light emitting type of the light source, examples of the light source include a light emitting diode (LED), a cold cathode fluorescent lamp (CCFL), and an organic EL.

In addition, the display device according to embodiments of the present invention, owing to excellent front light condensing properties of the light source unit of the present invention, achieves high contrast and high luminance. Examples of the display device include a liquid crystal display device and an organic electro-luminescence (EL) display device.

The projected image display element according to embodiments of the present invention including the laminate of the present invention has a visual confirmation effect due to high directivity of light reflection, such as an effect of allowing video information of the real world to be viewed from the front, and allowing video information of the virtual world and character information to be projected obliquely to be displayed. For example, by using the projected image display element according to embodiments of the present invention for a glass or a prompter of an automobile, it is possible to display information clearly and with high reproducibility while maintaining transparency in the front direction.

Examples of the configuration of the projected image display element according to embodiments of the present invention include: a configuration in which the laminate of the present invention is laminated on at least one surface of a clear material; and a configuration in which the laminate of the present invention is laminated between at least two clear materials. In the case of an interface of an automobile described below, the laminate of the present invention or the projected image display element of the present invention may be bonded to glass of an automobile with an adhesive interposed therebetween, or may be inserted into laminated glass used for an automobile. In addition, the laminate of the present invention may be bonded to a clear base material to form the projected image display element of the present invention, and may be used as a prompter.

The projected image display device according to embodiments of the present invention includes the projected image display element of the present invention and a light source from which light is incident at an angle of 20° or more with respect to a normal line of a display surface of the projected image display element. More specific applications include an interface including a windshield of a cockpit of an automobile or an aircraft, an electronic signboard, a head-up display (HUD) or a head-mounted display (HMD) used for a game device, and the like. In the case where the device is used in an interface of an automobile, information can be projected from a small projection base material toward glass of an automobile (windshield, side glass, rear glass, and the like) or a prompter formed of a clear base material, provided in the vicinity of a windshield.

The display screen filter according to embodiments of the present invention is characterized by including the laminate of the present invention. Since the display screen filter of the present invention has high transparency in the front direction and high reflectivity in the oblique direction, when the display screen filter is provided on the display screen of the display, the display of the screen can be clearly seen when the display screen is viewed from the front, but the display of the screen cannot be seen when the display screen is viewed from the lateral direction, which is an effect of preventing peeping. Furthermore, a louver film conventionally used for the purpose of preventing peeping has a problem that the brightness of the screen decreases when viewed from the front direction, but the display screen filter of the present invention hardly impairs the brightness of the screen.

In addition, the laminate of the present invention may be attached to a display screen of the display device as a completed product of the display device, or may be incorporated in an element constituting the screen. That is, a display device including the laminate of the present invention in an image display area thereof is also the display device of the present invention. Examples of a specific aspect of the display device of the present invention in this case include a liquid crystal display device in which the laminate of the present invention is disposed on the front surface of a liquid crystal cell, and an organic EL display device in which the laminate of the present invention is disposed on the front surface of a light emitting layer.

In addition, the laminate of the present invention can also be suitably used for decorative film applications in which hue and/or glossiness vary with the viewing direction, such as the front direction and the oblique direction.

EXAMPLES

The laminate of the present invention will be described with reference to specific examples. Even when a thermoplastic resin other than the thermoplastic resins specifically exemplified below is used, the laminate of the present invention can be similarly obtained in consideration of the description of the present specification including the following Examples.

[Method for Measuring Physical Properties and Method for Evaluating Effect]

Physical property values and effects are evaluated by methods described below.

(1) Main Orientation Axis Direction

The sample size was set to 10 cm×10 cm, and the sample was cut out at the center in the film width direction. The main orientation axis direction was determined using a molecular orientation meter MOA-2001 manufactured by KS Systems Corporation (current Oji Scientific Instruments Co., Ltd.).

(2) Transmittance

With a standard configuration (solid-state measurement system) of a spectrophotometer (U-4100 Spectrophotomater) manufactured by Hitachi, Ltd., the transmittance when light in a wavelength range of 400 to 700 nm was incident at an incident angle θ=0° was measured in increments of 1 nm, and the average transmittance was determined. As measurement conditions, a slit was set to 2 nm (visible), automatic control (infrared) was set, a gain was set to 2, and a scanning speed was set to 600 nm/min.

(3) Reflectance of Multilayer Laminated Film

An angle-variable reflection unit and a Glan-Taylor polarizer as attachments were attached to a spectrophotometer (U-4100 Spectrophotomater) manufactured by Hitachi, Ltd., and P-wave light and S-wave light were incident in increments of 1 nm in a wavelength range of 400 to 700 nm at incident angles θ=20°, 40°, and 70°, and reflectance of each of them was measured. From the obtained reflectances, Rpf20, Rpf40, and Rpf70 were determined as average reflectances with respect to the P wave, and Rsf20, Rsf40, and Rsf70 were determined as average reflectances with respect to the S wave, in the wavelength range of 400 nm to 700 nm at incident angles of 20°, 40°, and 70°. In addition, in the measurement at any incident angle, the azimuth $\phi$ of the incident light was a direction along the main orientation axis of the film.

(4) Reflectance of Laminate

An angle-variable reflection unit and a Glan-Taylor polarizer as attachments were attached to a spectrophotometer (U-4100 Spectrophotomater) manufactured by Hitachi, Ltd., S-wave light was incident in increments of 1 nm in a wavelength range of 400 to 700 nm at incident angles θ=20° and 70°, and reflectance of each was measured. Rs20(4) and Rs70(4), as average reflectances at wavelengths of 400 nm to 700 nm at incident angles of 20° and 70°, respectively, were determined from the obtained reflectances, and Rs70(4)−Rs20(4) was calculated. Here, the azimuth $\phi_n$ was measured at five points at 0°, 22.5°, 45°, 67.5°, and 90° set clockwise with respect to an arbitrary azimuth 0° in the plane of the film. In each of Examples described below, in which a polycarbonate uniaxially stretched sheet (PC sheet) is used, the 0° reference of the azimuth $\phi_n$ was set to the main orientation axis direction of the used PC sheet. In Comparative Examples in which the PC sheet was not used, the 0° standard of the azimuth $\phi_n$ was set to the main orientation axis direction of the multilayer laminated film in the laminate.

In addition, S-wave light n a wavelength range of 240 nm to 2600 nm is incident at an angle of 70° with respect to the normal line of the film surface at the azimuth $\phi_n$, the maximum value of the reflectance is obtained as $Rs70(\phi_n)$MAX and the minimum value of the reflectance is obtained as $Rs70(\phi_n)$MIN, and a difference therebetween was calculated as follows:

$$Rs70(\phi)\text{MAX}-Rs70(\phi)\text{MIN}.$$

Similarly, for the P wave, light of the P wave was incident in increments of 1 nm in a wavelength range of 400 to 700 nm at incident angles θ=20°, 40°, and 70°, and reflectance thereof was measured. From the obtained reflectance, Rp20 ($\phi_n$), Rp40 ($\phi_n$), and Rp70($\phi_n$) were determined as average reflectances with respect to the P wave in the wavelength range of 400 nm to 700 nm at incident angles of 20°, 40°, and 70°, respectively. Here, the azimuths $\phi_n$ are the same as those at the five points in the measurement with respect to the S wave, and the average values of $\phi_n$ at the five points at the respective incident angles are Rp20, Rp40, and Rp70, respectively.

(5) Phase Difference

A phase difference at a wavelength of 590 nm at an incident angle of 0° was determined using a phase difference measurement device (KOBRA-21ADH) manufactured by Oji Scientific Instruments Co., Ltd.

(6) Glass Transition Temperature, Melting Point

Five mg of a resin pellet was weighed with an electronic balance, enclosed in an aluminum packing, and measurement was performed by raising the temperature from 25° C. to 300° C. at 20° C./min according to JIS-K-7122 (2012) using a robot DSC-RDC220 differential scanning calorimeter manufactured by Seiko Instruments Inc. For data analysis, Disk Session SSC/5200 manufactured by the company was used. The glass transition temperature (Tg) and the melting point (Tm) were determined from the obtained DSC data.

(7) Refractive Index

The refractive indexes of the multilayer laminated film and the resin pellet were measured using Abbe Refractometer (NAR-4T) manufactured by Atago Co., Ltd., as well as a NaD ray lamp. Regarding the multilayer laminated film, the in-plane refractive index and the perpendicular refractive index thereof were measured in each of the longitudinal direction and the width direction. In the measurement of the refractive index of the resin pellet, the resin pellet was vacuum-dried at 70° C. for 48 hours, was molten at 280° C., then pressed using a press machine, and then rapidly cooled to prepare a sheet having a thickness of 500 μm, and the refractive index of the sheet was measured.

(8) Method for Measuring IV (Intrinsic Viscosity)

Dissolution at a temperature of 100° C. for 20 minutes using ortho-chlorophenol as a solvent was performed, and then the intrinsic viscosity was calculated from the solution viscosity measured at a temperature of 25° C. using an Ostwald viscometer.

(9) Visibility

The laminate was placed on the front surface of the LCD smartphone, the entire screen of the LCD smartphone was displayed in green, and the screen was viewed at an incident angle of 0° and an incident angle of 70° from the lateral direction (in the short side direction) of the LCD smartphone to evaluate the visibility of the screen. The laminate was placed such that the main orientation axis direction of the PC sheet in the laminate was an azimuth of 45° with respect to the lateral direction of the LCD smartphone. The brightness of the screen of the LCD smartphone used was dependent on the viewing angle, and the green display thereof at an incident angle of 70° was darker as compared with that at an incident angle of 0°, but the brightness thereof was sufficient to be visible.

(Resin Used for Film)

Details of the resin used for the film are as follows.

Resin A: Copolymer of polyethylene terephthalate with IV=0.67 (polyethylene terephthalate obtained by copolymerizing an isophthalic acid component in an amount of 10 mol % relative to the entire acid components), refractive index: 1.57, Tg: 75° C., Tm: 230° C.

Resin B: Polyethylene terephthalate with IV=0.65, refractive index: 1.58, Tg: 78° C., Tm: 254° C.

Resin C: Polyester obtained by blending a copolymer of polyethylene terephthalate with IV=0.67 (polyethylene terephthalate obtained by copolymerizing a 2,6-naphthalenedicarboxylic acid component in an amount of 60 mol % relative to the entire acid components) with terephthalic acid and an aromatic ester having a butylene group and an ethylhexyl group, and having a number average molecular weight of 2000 in an amount of 10% by mass with respect to the entire resin. Refractive index: 1.62, Tg: 90° C., no Tm.

Resin D: Copolymer of polyethylene naphthalate with IV=0.64 (polyethylene naphthalate obtained by copolymerizing 2,6-naphthalenedicarboxylic acid component in an amount of 80 mol % with respect to the entire acid component, an isophthalic acid component in an amount of 20 mol % with respect to the entire acid component, and polyethylene glycol having a molecular weight of 400 in an amount of 3 mol % with respect to the entire diol component). Refractive index: 1.64, Tg: 90° C., Tm: 216° C.

Resin E: Copolymer of polyethylene terephthalate with IV=0.73 (polyethylene terephthalate obtained by copolymerizing a cyclohexanedimethanol component in an amount of 33 mol % with respect to the entire diol component), refractive index: 1.57, Tg: 80° C., no Tm.

(Preparation of Multilayer Laminated Film)

(Multilayer Laminated Film 1)

The resin A was used as the thermoplastic resin constituting the layer A, and the resin C was used as the thermoplastic resin constituting the layer B. Each of the resin A and the resin C was molten at 280° C. with an extruder, and through 5 sheets of FSS type leaf disk filters, the resin A and the resin C were alternately joined in a 493-layer feed block (247 layers A and 246 layers B) designed to observe reflected light in a wavelength range of 400 nm to 600 nm when the P wave of light was incident at an incident angle of 70°, while being metered so that a discharge ratio (lamination ratio) was resin A/resin C=1.3 with a gear pump. Then, the resultant was supplied to a mold (T die) having a linear lip, molded into a sheet, and then rapidly cooled and solidified on a casting drum maintained at a surface temperature of 25° C. while an electrostatic voltage of 8 kV was applied with a wire to obtain an unstretched multilayer laminated film. This unstretched film was longitudinally stretched at 95° C. and a stretching ratio of 3.6, both surfaces of the film were subjected to a corona discharge treatment in air, and a laminate-forming film coating liquid composed of (polyester resin having a glass transition temperature of 18° C.)/(polyester resin having a glass transition temperature of 82° C.)/(silica particles having an average particle diameter of 100 nm) was applied to the treated surfaces on both of the sides of the film. Thereafter, the film was guided to a tenter that holds both end portions thereof with clips, subjected to lateral stretching at 110° C. and a stretching ratio of 3.7, then subjected to a heat treatment at 210° C., subjected to a relaxation heat treatment at 210° C. with a relaxation ratio in the width direction of 5%, and cooled at 100° C. to obtain a multilayer laminated film 1 having a thickness of 60 μm. The physical properties of the obtained film are shown in Table 1.

The refractive index of the layer A is a refractive index value measured from the multilayer laminated film. The refractive index of the layer B cannot be measured because the layer B is present inside the multilayer laminated film, but since the resin C is amorphous, the layer B is considered to have a refractive index equal to the refractive index of the resin pellet, i.e., 1.62, and to be isotropic.

(Multilayer Laminated Film 2)

The resin A was used as the thermoplastic resin constituting the layer A, and the resin C was used as the thermoplastic resin constituting the layer B. Each of the resin A and the resin C was molten at 280° C. with an extruder, and through 5 sheets of FSS type leaf disk filters, the resin A and the resin C were alternately joined in a 801-layer feed block (401 layers A and 400 layers B) designed to observe reflected light in a wavelength range of 400 nm to 700 nm when the P wave of light was incident at an incident angle of 70°, while being metered so that a discharge ratio (lamination ratio) was resin A/resin C=1.5 with a gear pump. Subsequently, an unstretched multilayer laminated film was obtained in the same manner as the multilayer laminated film 1. This unstretched film was longitudinally stretched at 95° C. and a stretching ratio of 3.6, both surfaces of the film were subjected to a corona discharge treatment in air, and a laminate-forming film coating liquid composed of (polyester resin having a glass transition temperature of 18° C.)/(polyester resin having a glass transition temperature of 82°

C.)/(silica particles having an average particle diameter of 100 nm) was applied to the treated surfaces on both of the sides of the film. Thereafter, the film was guided to a tenter to hold both end portions of the film with clips, subjected to lateral stretching at 110° C. and a stretching ratio of 3.7, then subjected to a heat treatment at 210° C., subjected to a relaxation heat treatment at 210° C. with a relaxation ratio in the width direction of 5%, and cooled at 100° C. to obtain a multilayer laminated film 2 having a thickness of 105 μm. The physical properties of the obtained film are shown in Table 1.

The refractive index of the layer A is a refractive index value measured from the multilayer laminated film. The refractive index of the layer B cannot be measured because the layer B is present inside the multilayer laminated film, but since the resin C is amorphous, the layer B is considered to have a refractive index equal to the refractive index of the resin pellet, i.e., 1.62, and to be isotropic.

(Multilayer Laminated Film 3)

The resin B was used as the thermoplastic resin constituting the layer A, and the resin D was used as the thermoplastic resin constituting the layer B. Each of the resin B and the resin D was molten at 280° C. with an extruder, and through 5 sheets of FSS type leaf disk filters, the resin B and the resin D were alternately joined in a 493-layer feed block (247 layers A and 246 layers B) designed to observe reflected light in a wavelength range of 400 nm to 600 nm when the P wave of light was incident at an incident angle of 70°, while being metered so that a discharge ratio (lamination ratio) was resin B/resin D=1.3 with a gear pump. Subsequently, an unstretched multilayer laminated film was obtained in the same manner as the multilayer laminated film 1. This unstretched film was longitudinally stretched at 95° C. and a stretching ratio of 3.3, both surfaces of the film were subjected to a corona discharge treatment in air, and a laminate-forming film coating liquid composed of (polyester resin having a glass transition temperature of 18° C.)/(polyester resin having a glass transition temperature of 82° C.)/(silica particles having an average particle diameter of 100 nm) was applied to the treated surfaces of both surfaces of the film. Thereafter, the film was guided to a tenter holding both end portions with clips, subjected to lateral stretching at 100° C. and a stretching ratio of 3.5 times, then subjected to a heat treatment at 230° C., subjected to a relaxation heat treatment at 230° C. with a relaxation ratio in the width direction of 5%, and cooled at 100° C. to obtain a multilayer laminated film 3 having a thickness of 60 μm. The physical properties of the obtained film are shown in Table 1.

The refractive index of the layer A is a refractive index value measured from the multilayer laminated film. The refractive index of the layer B cannot be measured because the layer B is present inside the multilayer laminated film, but since the resin D has a melting point of 216° C. and crystals thereof are molten by the heat treatment at 230° C. thereby making the resin D amorphous, the layer B is considered to have a refractive index equal to the refractive index of the resin pellet, i.e., 1.64, and to be isotropic.

(Multilayer Laminated Film 4)

The resin B was used as the thermoplastic resin constituting the layer A, and the resin D was used as the thermoplastic resin constituting the layer B. Each of the resin B and the resin D was molten at 280° C. with an extruder, and through 5 sheets of FSS type leaf disk filters, the resin B and the resin D were alternately joined in a 801-layer feed block (401 layers A and 400 layers B) designed to observe reflected light in a wavelength range of 400 nm to 700 nm when the P wave of light was incident at an incident angle of 70°, while being metered so that a discharge ratio (lamination ratio) was resin B/resin D=1.5 with a gear pump. Subsequently, an unstretched multilayer laminated film was obtained in the same manner as the multilayer laminated film 1. This unstretched film was longitudinally stretched at 95° C. and a stretching ratio of 3.3, both surfaces of the film were subjected to a corona discharge treatment in air, and a laminate-forming film coating liquid composed of (polyester resin having a glass transition temperature of 18° C.)/(polyester resin having a glass transition temperature of 82° C.)/(silica particles having an average particle diameter of 100 nm) was applied to the treated surfaces of both surfaces of the film. Thereafter, the film was guided to a tenter to hold both end portions of the film with clips, subjected to lateral stretching at 100° C. and a stretching ratio of 3.5, then subjected to a heat treatment at 230° C., subjected to a relaxation heat treatment at 230° C. with a relaxation ratio in the width direction of 5%, and cooled at 100° C. to obtain a multilayer laminated film 4 having a thickness of 105 μm. The physical properties of the obtained film are shown in Table 1.

The refractive index of the layer A is a refractive index value measured from the multilayer laminated film. The refractive index of the layer B cannot be measured because the layer B is present inside the multilayer laminated film, but since the resin D has a melting point of 216° C. and crystals thereof are molten by the heat treatment at 230° C. thereby making the resin D amorphous, the layer B is considered to have a refractive index equal to the refractive index of the resin pellet, i.e., 1.64, and to be isotropic.

(Birefringence Layer)

A 60 μm-thick uniaxially stretched polycarbonate sheet (PC sheet) was used as the birefringence layer. The phase difference was 270 nm at an incident angle of 0° and a wavelength of 590 nm.

Example 1

Two multilayer laminated films 1 and one PC sheet were bonded with an acrylic optical pressure-sensitive adhesive in a thickness of 25 μm, with use of a laminator, to prepare a laminate having the following configuration.

Multilayer laminated film 1/pressure-sensitive adhesive/PC sheet (birefringence layer)/pressure-sensitive adhesive/multilayer laminated film 1

Physical properties of the obtained laminate are shown in Tables 2 and 3.

Example 2

Two multilayer laminated films 2 and one PC sheet were bonded with an acrylic optical pressure-sensitive adhesive in a thickness of 25 μm, with use of a laminator, to prepare a laminate having the following configuration.

Multilayer laminated film 2/pressure-sensitive adhesive/PC sheet (layer having birefringence)/pressure-sensitive adhesive/multilayer laminated film 2

Physical properties of the obtained laminate are shown in Tables 2 and 3.

Example 3

Two multilayer laminated films 3 and one PC sheet were bonded with an acrylic optical pressure-sensitive adhesive in a thickness of 25 μm, with use of a laminator, to prepare a laminate having the following configuration.

Multilayer laminated film 3/pressure-sensitive adhesive/ PC sheet (layer having birefringence)/pressure-sensitive adhesive/multilayer laminated film 3

Physical properties of the obtained laminate are shown in Tables 2 and 3.

Example 4

Two multilayer laminated films 4 and one PC sheet were bonded with an acrylic optical pressure-sensitive adhesive in a thickness of 25 μm, with use of a laminator, to prepare a laminate having the following configuration.

Multilayer laminated film 4/pressure-sensitive adhesive/ PC sheet (layer having birefringence)/pressure-sensitive adhesive/multilayer laminated film 4

Physical properties of the obtained laminate are shown in Tables 2 and 3.

As a result of evaluating the visibility in this Example, at an incident angle of 0°, external light was slightly reflected, but the brightness of green display was almost the same as that when the laminate was not installed. In addition, at an incident angle of 70°, the screen was very dark and green display was hardly visible.

Example 5

Both surfaces of the laminate produced in Example 4 were coated with a fluorine-containing acrylate compound (refractive index: 1.37) to form an AR layer. Physical properties of the obtained laminate are shown in Tables 2 and 3. The transmittance of perpendicularly incident light was improved, and the reflectance in the oblique direction was hardly reduced.

As a result of evaluating the visibility in this Example, at an incident angle of 0°, the brightness of green display was almost the same as that when the laminate was not installed, and almost no external light was reflected. In addition, at an incident angle of 70°, the screen was very dark and green display was hardly visible.

Comparative Example 1

Two multilayer laminated films 4 were bonded with an acrylic optical pressure-sensitive adhesive in a thickness of 25 μm, with use of a laminator, to prepare a laminate having a configuration of (multilayer laminated film 4/pressure-sensitive adhesive/multilayer laminated film 4). In the bonding, the multilayer laminated films were bonded with the main orientation axis directions thereof being aligned. The physical properties of the obtained laminate are shown in Table 2 to 3.

As a result of evaluating the visibility in this Comparative Example, at an incident angle of 0°, external light was slightly reflected, but the brightness of green display was almost the same as that when the laminate was not installed. On the other hand, at the incident angle of 70°, the green display was darker than that when the laminate was not installed, but the brightness thereof was sufficient to be visible.

Comparative Example 2

Both surfaces of the laminate produced in Comparative Example 1 were coated with a fluorine-containing acrylate compound (refractive index: 1.37) to form an AR layer. The physical properties of the obtained laminate are shown in Table 2 to 3. The transmittance with respect to the perpendicularly incident light was improved, but the reflectance in the oblique direction was significantly decreased due to the decrease in the reflectance with respect to the S wave.

As a result of evaluating the visibility in this Comparative Example, at an incident angle of 0°, the brightness of green display was almost the same as that when the laminate was not installed, and almost no external light was reflected $\phi_n$ the other hand, at the incident angle of 70°, the green display was darker than that when the laminate was not installed, but the brightness thereof was sufficient to be visible.

[Table 1-1]

| | Resin of layer A (−) | Resin of layer B (−) | Number of layers (−) | Transmittance (%) | P-wave reflectance | | | S-wave reflectance | | |
|---|---|---|---|---|---|---|---|---|---|---|
| | | | | | Rpf20 (%) | Rpf40 (%) | Rpf70 (%) | Rsf20 (%) | Rsf40 (%) | Rsf70 (%) |
| Multilayer laminated film 1 | Resin A | Resin C | 491 | 89 | 11 | 19 | 40 | 12 | 20 | 51 |
| Multilayer laminated film 2 | Resin A | Resin C | 801 | 89 | 12 | 22 | 56 | 13 | 19 | 51 |
| Multilayer laminated film 3 | Resin B | Resin D | 491 | 91 | 10 | 20 | 47 | 11 | 18 | 50 |
| Multilayer laminated film 4 | Resin B | Resin D | 801 | 91 | 9 | 23 | 69 | 10 | 17 | 49 |

[Table 1-2]

|  | Refractive Index of layer A | | | | Refractive Index of layer B |
| --- | --- | --- | --- | --- | --- |
|  | Longitudinal-in-plane | Longitudinal-perpendicular | Width-in-plane | Width-perpendicular | |
|  | (−) | (−) | (−) | (−) | (−) |
| Multilayer laminated film 1 | 1.63 | 1.53 | 1.63 | 1.53 | 1.62 |
| Multilayer laminated film 2 | 1.63 | 1.53 | 1.63 | 1.53 | 1.62 |
| Multilayer laminated film 3 | 1.65 | 1.49 | 1.65 | 1.49 | 1.64 |
| Multilayer laminated film 4 | 1.65 | 1.49 | 1.65 | 1.49 | 1.64 |

[Table 2-1]

|  | Transmittance | P-wave reflectance | | | Rs20 ($\varphi_n$) | | | | |
| --- | --- | --- | --- | --- | --- | --- | --- | --- | --- |
|  |  | Rp20 | Rp40 | Rp70 | $\varphi_n = 0°$ | $\varphi_n = 22.5°$ | $\varphi_n = 45°$ | $\varphi_n = 67.5°$ | $\varphi_n = 90°$ |
|  | (%) | (%) | (%) | (%) | (%) | (%) | (%) | (%) | (%) |
| Example 1 | 87 | 11 | 24 | 46 | 14 | 14 | 15 | 14 | 13 |
| Example 2 | 87 | 11 | 29 | 69 | 13 | 13 | 13 | 13 | 13 |
| Example 3 | 89 | 9 | 25 | 53 | 11 | 11 | 10 | 11 | 11 |
| Example 4 | 89 | 9 | 30 | 79 | 11 | 11 | 10 | 11 | 11 |
| Example 5 | 96 | 4 | 26 | 77 | 5 | 5 | 6 | 5 | 5 |
| Comparative Example 1 | 89 | 9 | 36 | 87 | 11 | 11 | 11 | 11 | 11 |
| Comparative Example 2 | 96 | 4 | 31 | 84 | 5 | 5 | 5 | 5 | 5 |

[Table 2-2]

|  | Rs70 ($\varphi_n$) | | | | |
| --- | --- | --- | --- | --- | --- |
|  | $\varphi_n = 0°$ | $\varphi_n = 22.5°$ | $\varphi_n = 45°$ | $\varphi_n = 67.5°$ | $\varphi_n = 90°$ |
|  | (%) | (%) | (%) | (%) | (%) |
| Example 1 | 55 | 59 | 67 | 59 | 56 |
| Example 2 | 54 | 65 | 77 | 64 | 54 |
| Example 3 | 53 | 63 | 72 | 62 | 52 |
| Example 4 | 52 | 65 | 82 | 66 | 52 |
| Example 5 | 35 | 57 | 77 | 57 | 36 |
| Comparative Example 1 | 52 | 53 | 52 | 51 | 52 |
| Comparative Example 2 | 36 | 36 | 37 | 37 | 35 |

TABLE 3

|  | Rs70 ($\varphi_n$)−Rs20 ($\varphi_n$) | | | | | Rs70 ($\varphi_n$) MAX−Rs70 ($\varphi_n$) MIN | | | | |
| --- | --- | --- | --- | --- | --- | --- | --- | --- | --- | --- |
|  | $\varphi_n = 0°$ | $\varphi_n = 22.5°$ | $\varphi_n = 45°$ | $\varphi_n = 67.5°$ | $\varphi_n = 90°$ | $\varphi_n = 0°$ | $\varphi_n = 22.5°$ | $\varphi_n = 45°$ | $\varphi_n = 67.5°$ | $\varphi_n = 90°$ |
|  | (%) | (%) | (%) | (%) | (%) | (%) | (%) | (%) | (%) | (%) |
| Example 1 | 41 | 45 | 52 | 45 | 43 | 13 | 28 | 46 | 27 | 13 |
| Example 2 | 41 | 52 | 64 | 51 | 41 | 12 | 15 | 23 | 26 | 11 |
| Example 3 | 42 | 52 | 62 | 51 | 41 | 11 | 24 | 45 | 25 | 11 |
| Example 4 | 41 | 54 | 72 | 55 | 41 | 14 | 23 | 41 | 22 | 14 |
| Example 5 | 30 | 53 | 71 | 52 | 31 | 15 | 27 | 51 | 28 | 16 |

TABLE 3-continued

| | Rs70 ($\varphi_n$)-Rs20 ($\varphi_n$) | | | | | Rs70 ($\varphi_n$) MAX-Rs70 ($\varphi_n$) MIN | | | | |
|---|---|---|---|---|---|---|---|---|---|---|
| | $\varphi_n = 0°$ | $\varphi_n = 22.5°$ | $\varphi_n = 45°$ | $\varphi_n = 67.5°$ | $\varphi_n = 90°$ | $\varphi_n = 0°$ | $\varphi_n = 22.5°$ | $\varphi_n = 45°$ | $\varphi_n = 67.5°$ | $\varphi_n = 90°$ |
| | (%) | (%) | (%) | (%) | (%) | (%) | (%) | (%) | (%) | (%) |
| Comparative Example 1 | 41 | 42 | 41 | 40 | 41 | 14 | 13 | 13 | 15 | 14 |
| Comparative Example 2 | 31 | 31 | 32 | 32 | 30 | 15 | 14 | 14 | 15 | 14 |

DESCRIPTION OF REFERENCE SIGNS

1: Reflectance of S wave incident on film
2: Reflectance of P wave incident on film
3: Laminate or film
4: Direction at an azimuth of 0° arbitrarily selected in film plane
5: Direction at azimuth ϕ as a result of rightward rotation (clockwise rotation) with respect to the direction at the azimuth of 0°
6: Azimuth ϕ
7: Example of laminate according to embodiments of present invention
8a, 8b: Multilayer laminated film
9: Birefringence layer
10a: P wave component incident on multilayer laminated film
10b: P wave component subjected to interference reflection by multilayer laminated film 8a
11a: S wave component incident on multilayer laminated film
11b: S wave component transmitted through multilayer laminated film 8a
12a: P wave component into which S wave 11b is converted when passing through birefringence layer 9, entering multilayer laminated film 8b
12b: P wave component resulting from interference reflection of P wave component 12a by multilayer laminated film 8b
13: Clear adhesive layer
14: Depolarizing layer
15a: S wave component resulting from S wave 11b passing through depolarizing layer and thereafter passing through multilayer laminated film 8b
15b: P wave component into which S wave 11b is converted when passing through the depolarizing layer, entering multilayer laminated film 8b
15c: P wave component resulting from interference reflection of P wave component 15b by multilayer laminated film 8b

The invention claimed is:

1. A laminate comprising a multilayer laminated film in which 11 or more layers of a plurality of different thermoplastic resins are alternately laminated,
wherein, with respect to light in a wavelength range of 400 to 700 nm and that is perpendicularly incident on an outer surface of the multilayer laminated film, the laminate has an average transmittance in the wavelength range of 50% or more, and
when average reflectances in a wavelength range of 400 to 700 nm with respect to S-wave light in the wavelength range that is incident at angles of 20° and 70° with respect to a normal line of the outer surface of the multilayer laminated film at azimuths $\phi_n$ (n: 1 to 5) are given as Rs20($\phi_n$) and Rs70($\phi_n$), respectively, the laminate satisfies, at least one azimuth $\phi_n$:

$$Rs70(\phi_n)-Rs20(\phi_n) \geq 50(\%),$$

wherein $\phi_n$ (n: 1 to 5) are five set points at 0°, 22.5°, 45°, 67.5°, and 90° set at every 22.5° in rightward rotation with respect to the direction at the arbitrary azimuth of 0° in a plane of the multilayer laminate film.

2. The laminate according to claim 1, wherein
when average reflectances (%) in the wavelength range of 400 to 700 nm and at the azimuths $\phi_n$ (n: 1 to 5) with respect to P-wave light in the wavelength range that is incident at angles of 20°, 40°, and 70° with respect to the normal line of the outer surface of the multilayer laminated film at the azimuths $\phi_n$ are given as Rp20, Rp40, and Rp70, respectively, Rp20, Rp40, and Rp70 satisfy:

$$Rp20 \leq Rp40 < Rp70.$$

3. The laminate according to claim 1, wherein
when S-wave light in a wavelength range of 240 nm to 2600 nm is incident at an angle of 70° with respect to the normal line of the outer surface of the multilayer laminated film at the azimuth $\phi_n$, a maximum value of a reflectance in the wavelength range is given as Rs70($\phi_n$)MAX, and a minimum value of the reflectance in the wavelength range is given as Rs70($\phi_n$)MIN, the following is satisfied at at least one azimuth $\phi_n$:

$$Rs70(\phi_n)MAX-Rs70(\phi_n)MIN \geq 20(\%).$$

4. The laminate according to claim 1, further comprising a layer having birefringence,
wherein the laminate is configured to include the multilayer laminated films on both sides of the layer having birefringence, or
the laminate is configured to include the multilayer laminated films on both sides of the layer having birefringence with adhesive layers interposed therebetween.

5. The laminate according to claim 4, wherein the layer having birefringence has a phase difference of 240 to 320 nm or 100 to 180 nm at a wavelength of 590 nm.

6. The laminate according to claim 4, wherein the layer having birefringence contains any one of polyvinyl alcohol, polycarbonate, cycloolefin, polymethyl methacrylate, and liquid crystal as a main component.

7. The laminate according to claim 4, wherein the layer having birefringence is a uniaxially oriented layer.

8. The laminate according to claim 4, wherein the layer having birefringence has a layer thickness of 1 to 200 μm.

9. The laminate according to claim 1, further comprising a layer having a depolarizing effect and containing liquid crystal and/or particles having an aspect ratio of 1.5 or more,
wherein the laminate is configured to include the multilayer laminated films on both sides of the layer having the depolarizing effect, or the laminate is configured to include the multilayer laminated films on both sides of the layer having the depolarizing effect with adhesive layers interposed therebetween.

10. The laminate according to claim 9, wherein the layer having a depolarizing effect contains random liquid crystal or inorganic particles having an aspect ratio of 1.5 or more.

11. A method for manufacturing the laminate according to claim 4, the method comprising:
providing a layer having birefringence on a base material;
laminating a multilayer laminated film on a side, of the layer having birefringence, on which the base material is not disposed;
peeling off the base material; and
laminating another multilayer laminated film on a side, of the layer having birefringence, from which the base material is peeled off.

12. A method for manufacturing the laminate according to claim 4, the method comprising the step of laminating a multilayer laminated film on one side or both sides of the layer having birefringence and then stretching the film in at least one direction.

13. A method for manufacturing the laminate according to claim 4, the method comprising the step of applying a coating liquid containing a component constituting a layer having birefringence onto a multilayer laminated film.

14. The method according to claim 13, the method further comprising the step of laminating another multilayer laminated film on a surface on a side, of the layer having birefringence or a coating film resulting from the coating liquid, on which the multilayer laminated film is not disposed.

15. A method for manufacturing the laminate according to claim 9, the method comprising:
providing a layer having a depolarizing effect on a base material;
laminating a multilayer laminated film on a side, of the layer having the depolarizing effect, on which the base material is not disposed;
peeling off the base material; and
laminating another multilayer laminated film on a side, of the layer having the depolarizing effect, from which the base material is peeled off.

16. A method for manufacturing the laminate according to claim 9, the method comprising the step of laminating a multilayer laminated film on one side or both sides of the layer having the depolarizing effect, and then stretching the film in at least one direction.

17. A method for manufacturing the laminate according to claim 9, the method comprising the step of applying a coating liquid containing a component constituting a layer having a depolarizing effect on a multilayer laminated film.

18. The method according to claim 17, further comprising the step of laminating another multilayer laminated film on a surface on a side, of the layer having the depolarizing effect or a coating film resulting from the coating liquid, on which the multilayer laminated film is not disposed.

19. A light guide plate unit comprising the laminate according to claim 1 arranged on an emitting surface side of a light guide plate.

20. A light source unit comprising the light guide plate unit according to claim 19 and a light source.

21. A light source unit comprising the laminate according to claim 1 arranged on an emitting surface side of a substrate on which a plurality of light sources are provided.

22. A display device comprising the light source unit according to claim 20.

23. A projected image display element comprising the laminate according to claim 1.

24. The projected image display element according to claim 23, wherein the laminate is laminated on at least one surface of a clear material.

25. The projected image display element according to claim 23, wherein the laminate is laminated between at least two clear materials.

26. A projected image display device comprising:
the projected image display element according to claim 23; and
a light source from which light is incident at an angle of 20° or more with respect to a normal line of a display surface of the projected image display element.

27. A display screen filter comprising the laminate according to claim 1.

28. A display device comprising the laminate according to claim 1 in an image display area.

* * * * *